United States Patent
Watanabe

(10) Patent No.: US 12,286,552 B2
(45) Date of Patent: Apr. 29, 2025

(54) COATING MATERIAL COMPOSITION, AND METHOD FOR FORMING MULTILAYER COATING FILM

(71) Applicant: KANSAI PAINT CO., LTD., Hyogo (JP)

(72) Inventor: Kazuya Watanabe, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 18/032,078

(22) PCT Filed: Oct. 7, 2021

(86) PCT No.: PCT/JP2021/037215
§ 371 (c)(1),
(2) Date: Apr. 14, 2023

(87) PCT Pub. No.: WO2022/097418
PCT Pub. Date: May 12, 2022

(65) Prior Publication Data
US 2024/0018385 A1  Jan. 18, 2024

(30) Foreign Application Priority Data
Nov. 9, 2020 (JP) .................................. 2020-186849

(51) Int. Cl.
| | |
|---|---|
| C09D 175/04 | (2006.01) |
| B05D 7/00 | (2006.01) |
| C08G 18/62 | (2006.01) |
| C08G 18/73 | (2006.01) |
| C08K 5/17 | (2006.01) |
| C08K 9/04 | (2006.01) |
| C09D 7/48 | (2018.01) |
| C09D 7/62 | (2018.01) |
| C09D 7/63 | (2018.01) |

(52) U.S. Cl.
CPC ............ *C09D 175/04* (2013.01); *B05D 7/52* (2013.01); *B05D 7/534* (2013.01); *B05D 7/56* (2013.01); *B05D 7/57* (2013.01); *B05D 7/574* (2013.01); *C08G 18/6229* (2013.01); *C08G 18/73* (2013.01); *C08K 5/17* (2013.01); *C08K 9/04* (2013.01); *C09D 7/48* (2018.01); *C09D 7/62* (2018.01); *C09D 7/63* (2018.01)

(58) Field of Classification Search
CPC combination set(s) only.
See application file for complete search history.

(56) References Cited

U.S. PATENT DOCUMENTS

| | | | | |
|---|---|---|---|---|
| 2009/0076198 A1* | 3/2009 | Giesenberg | ............... | C09C 1/40 524/133 |
| 2015/0146156 A1* | 5/2015 | Hirai | ..................... | C09K 19/56 349/194 |
| 2016/0011349 A1* | 1/2016 | Hirai | ..................... | C09K 19/04 349/193 |
| 2017/0210880 A1* | 7/2017 | Boday | .................... | C09J 201/00 |
| 2018/0265717 A1* | 9/2018 | Watanabe | ................. | C09C 1/30 |
| 2018/0265730 A1* | 9/2018 | Watanabe | ............ | C09D 133/10 |

FOREIGN PATENT DOCUMENTS

| | | |
|---|---|---|
| JP | 2008518067 A | 5/2008 |
| JP | 2009120700 A | 6/2009 |
| JP | 2013053305 A | 3/2013 |
| JP | 201379323 A | 5/2013 |
| JP | 2013249400 A | 12/2013 |
| WO | WO-2006045713 A1 | 5/2006 |
| WO | WO-2017056911 A1 | 4/2017 |

OTHER PUBLICATIONS

English-language translation of the Written Opinion of The International Searching Authority for PCT/JP2021/037215, Dec. 28, 2021, 13 pages. (Year: 2021).*
International Search Report issued in International Patent Application No. PCT/R2021/037215, mailed Dec. 28, 2021.

* cited by examiner

*Primary Examiner* — Peter A Salamon
(74) *Attorney, Agent, or Firm* — MARSHALL, GERSTEIN & BORUN LLP

(57) ABSTRACT

There is provided a coating composition capable of forming a coating film exhibiting excellent scratch resistance over a long period of time even in an outdoor environment. The coating composition including a hydroxyl group-containing resin (A), a crosslinking agent (B), and a dispersion of silica particles (C) having a hydroxyl group-containing acrylic resin (c1) bonded thereto and an ultraviolet absorber (c21) and/or a hindered amine-based light stabilizer (c22) bonded thereto.

16 Claims, No Drawings

COATING MATERIAL COMPOSITION, AND METHOD FOR FORMING MULTILAYER COATING FILM

TECHNICAL FIELD

The present invention relates to a coating composition and a method of forming a multilayer coating film.

BACKGROUND

A paint to be applied onto an object to be coated such as an automobile body is required to have excellent coating film appearance and excellent coating film performance such as scratch resistance.

For example, JP 2013-249400 A discloses a coating composition containing: silica particles (A) that are surface-modified with a specific hydrolyzable silane compound (a); and a binder component (B).

JP 2013-53305 A discloses a coating composition containing: (A) a hydroxyl group-containing acrylic resin that is a copolymer of monomer components including (a) 25 to 50 mass % of a hydroxyl group-containing polymerizable unsaturated monomer, (b) 5 to 30 mass % of a polymerizable unsaturated monomer having an alicyclic hydrocarbon group having 6 to 20 carbon atoms, and (c) 20 to 70 mass % of another polymerizable unsaturated monomer; (B) a polyisocyanate compound including an aliphatic diisocyanate having an isocyanurate trimer content of 30 to 70 mass %, a uretdione dimer content of 3 to 30 mass %, and a content of other trimer and higher order multimers of 0 to 67 mass %, based on the total amount of the polyisocyanate compound; and (C) polysiloxane-modified silica particles having an average primary particle size of 1 to 40 nm.

According to these techniques in the related art, excellent performance such as scratch resistance can be imparted to the resulting cured coating film. However, in a case of a coating film which is placed in an outdoor environment for a long period of time, such as an exterior coating film of an automobile, the scratch resistance may be deteriorated by an action of sunlight, wind, rain, or the like.

SUMMARY OF THE DISCLOSURE

The present invention is directed to providing a coating composition capable of forming a coating film excelling in scratch resistance, particularly a coating composition capable of forming a coating film that can maintain excellent scratch resistance for a long period of time even in an outdoor environment.

The present invention relates to a coating composition and a method of forming a multilayer coating film, including the following aspects.

Aspect 1

A coating composition containing:
a hydroxyl group-containing resin (A);
a crosslinking agent (B); and
a dispersion of silica particles © to which a hydroxyl group-containing acrylic resin (c1) is bonded and to which an ultraviolet absorber (c21) and/or a hindered amine-based light stabilizer (c22) is bonded.

Aspect 2

The coating composition according to aspect 1, wherein the hydroxyl group-containing resin (A) includes a resin' (A') having a hydroxyl group and an alkoxysilyl group.

Aspect 3

The coating composition according to aspect 1 or 2, wherein the hydroxyl group-containing resin (A) includes a hydroxyl group-containing acrylic resin (A1).

Aspect 4

The coating composition according to any one of aspects 1 to 3, wherein the crosslinking agent (B) includes a polyisocyanate compound (B1).

Aspect 5

The coating composition according to any one of aspects 1 to 4, wherein the ultraviolet absorber (c21) and/or the hindered amine-based light stabilizer (c22) is bonded to the hydroxyl group-containing acrylic resin (c1), and the hydroxyl group-containing acrylic resin (c1), to which the ultraviolet absorber (c21) and/or the hindered amine-based light stabilizer (c22) is bonded, is bonded to the silica particl©(C).

Aspect 6

The coating composition according to aspect 2, wherein the dispersion of silica part©es (C) includes a reaction product of silica particles (a) having a polymerizable unsaturated group and a polymerizable unsaturated monomer mixture (b), and the polymerizable unsaturated monomer mixture (b) includes, as at least a part of components thereof, a hydroxyl group-containing polymerizable unsaturated monomer and at least one type of polymerizable unsaturated monomer selected from a polymerizable unsaturated monomer to which the ultraviolet absorber (c21) is bonded and a polymerizable unsaturated monomer to which the hindered amine-based light stabilizer (c22) is bonded.

Aspect 7

The coating composition according to aspect 6, wherein a proportion of the hydroxyl group-containing polymerizable unsaturated monomer in the polymerizable unsaturated monomer mixture (b) is in a range of 4.5 to 37.5 mass % with respect to a total amount of the polymerizable unsaturated monomer mixture (b).

Aspect 8

The coating composition according to aspect 6 or 7, wherein the hydroxyl group-containing acrylic resin (c1) produced from the polymerizable unsaturated monomer mixture (b) has a hydroxyl value in a range of 20 to 215 mg KOH/g.

Aspect 9

The coating composition according to any one of aspects 6 to 8, wherein a total proportion of the polymerizable unsaturated monomer to which the ultraviolet absorber (c21) is bonded and the polymerizable unsaturated monomer to which the hindered amine-based light stabilizer (c22) is bonded in the polymerizable unsaturated monomer mixture (b) is in a range of 0.5 to 40 mass % with respect to the total amount of the polymerizable unsaturated monomer mixture (b).

Aspect 10

The coating composition according to any one of aspects 6 to 9, wherein a mass ratio of the silica particles (a) having a polymerizable unsaturated group to the polymerizable unsaturated monomer mixture (b) is in a range of 20/80 to 90/10 in terms of a ratio (a)/(b).

Aspect 11

The coating composition according to any one of aspects 1 to 10, wherein each of the ultraviolet absorber (c21) and/or the hindered amine-based light stabilizer (c22), and the hydroxyl group-containing acrylic resin (c1) is independently bonded to the silica p©icles (C).

Aspect 12

The coating composition according to aspect 11,
wherein the dispersion of silic©articles (C) includes a reaction product of sili'a particles (a') to which the ultraviolet absorber (c21) and/or the hindered amine-based light stabilizer (c22) is bonded and which have a polymerizable unsaturated group, and a polymerizable unsaturated monomer mixture (d), and
the polymerizable unsaturated monomer mixture (d) includes a hydroxyl group-containing polymerizable unsaturated monomer as at least a part of components thereof.

Aspect 13

The coating composition according to aspect 12, wherein a proportion of the hydroxyl group-containing polymerizable unsaturated monomer in the polymerizable unsaturated monomer mixture (d) is in a range of 4.5 to 50 mass % with respect to a total amount of the polymerizable unsaturated monomer mixture (d).

Aspect 14

The coating composition according to aspect 12 or 13, wherein the hydroxyl group-containing acrylic resin (c1) produced from the polymerizable unsaturated monomer mixture (d) has a hydroxyl value in a range of 20 to 215 mg KOH/g.

Aspect 15

The coating composition according to any one of aspects 12 to 14, wherein a mass ratio of the sili'a particles (a') to which the ultraviolet absorber (c21) and/or the hindered amine-based light stabilizer (c22) is bonded and which have a polymerizable unsaturated group to the polymerizable unsaturated monomer mixture (d) is in a range of 20/80 to 90/10 in term' of a ratio (a')/(d).

Aspect 16

A method of forming a multilayer coating film by sequentially applying at least one layer of a colored basecoat paint and at least one layer of a clearcoat paint to an object to be coated, the method including applying the coating composition according to any one of aspects 1 to 15 as the clearcoat paint for an uppermost layer.

Advantageous Effects of Invention

According to the coating composition of the present invention, it is possible to form a coating film capable of maintaining excellent scratch resistance for a long period of time even in an outdoor environment.

DETAILED DESCRIPTION

Hereinafter, the present invention will be described in detail.

A coating composition of the present invention (hereinafter, sometimes abbreviated as "the present paint") is a coating composition containing: a hydroxyl group-containing resin (A); a crosslinking agent (B); and a dispersion of silica particles (C) to which a hydroxyl group-containing acrylic resin (c1) is bonded and to which an ultraviolet absorber (c21) and/or a hindered amine-based light stabilizer (c22) is bonded.

Hydroxyl Group-Containing Resin (A)

The hydroxyl group-containing resin (A) is a resin having at least one hydroxyl group per molecule. As the hydroxyl group-containing resin (A), a wide variety of known resins can be used, and examples thereof include resins such as an acrylic resin having a hydroxyl group, a polyester resin having a hydroxyl group, an acryl-modified polyester resin having a hydroxyl group, a polyether resin having a hydroxyl group, a polycarbonate resin having a hydroxyl group, a polyurethane resin having a hydroxyl group, an epoxy resin having a hydroxyl group, and an alkyd resin having a hydroxyl group. Furthermore, as the hydroxyl group-containing resin (A), a resin (A') having a hydroxyl group and an alkoxysilyl group, such as an acrylic resin having a hydroxyl group and an alkoxysilyl group or a polyester resin having a hydroxyl group and an alkoxysilyl group, may be used. These resins can each be used alone, or two or more types of these resins can be combined and used. Among these, the hydroxyl group-containing resin (A) preferably includes a hydroxyl group-containing acrylic resin (A1) from the viewpoints of scratch resistance, water resistance, and the like of a coating film to be formed.

Hydroxyl Group-Containing Acrylic Resin (A1)

The hydroxyl group-containing acrylic resin (A1) can be obtained, for example, by copolymerizing a hydroxyl group-containing polymerizable unsaturated monomer and another polymerizable unsaturated monomer (a polymerizable unsaturated monomer other than the hydroxyl group-containing polymerizable unsaturated monomer).

The hydroxyl group-containing polymerizable unsaturated monomer is a compound having one or more hydroxyl groups and one or more polymerizable unsaturated bonds per molecule. Examples of the hydroxyl group-containing polymerizable unsaturated monomer include: monoesterified products of (meth)acrylic acid and a dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone modified products of the monoesterified products of (meth)acrylic acid and a dihydric alcohol having 2 to 8 carbon atoms; adducts of (meth)acrylic acid and an epoxy group-containing compound (e.g., "Cardura E10P" (trade name, available from Hexion, glycidyl neodecanoate);

N-hydroxymethyl (meth)acrylamide; allyl alcohols; and (meth)acrylates having a polyoxyethylene chain with a hydroxyl group at the molecular terminal.

As the other polymerizable unsaturated monomer that is copolymerizable with the hydroxyl group-containing polymerizable unsaturated monomer, for example, monomers described in the following (1) to (8) can be used. These polymerizable unsaturated monomers can be each used alone or in combination in two or more.

(1) Acid Group-Containing Polymerizable Unsaturated Monomer

The acid group-containing polymerizable unsaturated monomer is a compound having one or more acid groups and one or more polymerizable unsaturated bonds per molecule. Examples of the monomer include: carboxyl group-containing monomers such as (meth)acrylic acid, crotonic acid, itaconic acid, maleic acid, and maleic anhydride; sulfonate group-containing monomers such as vinyl sulfonic acid and 2-sulfoethyl (meth)acrylate; and acidic phosphate-based monomers such as 2-(meth)acryloyloxyethyl acid phosphate, 2-(meth)acryloyloxypropyl acid phosphate, 2-(meth)acryloyloxy-3-chloropropyl acid phosphate, and 2-methacryloyloxyethylphenyl phosphoric acid. One type of these can be used or two or more types thereof can be used. In a case where the acid group-containing polymerizable unsaturated monomer is used, the usage amount thereof is set such that the hydroxyl group-containing acrylic resin (A1) has an acid number of preferably 0.5 to 15 mg KOH/g, and particularly 1 to 10 mg KOH/g.

(2) Esterified Product of Acrylic Acid or Methacrylic Acid and Monohydric Alcohol Having 1 to 20 Carbon Atoms Specific examples thereof include methyl (meth)acrylate, ethyl (meth)acrylate, propyl (meth)acrylate, n-butyl (meth)acrylate, iso-butyl (meth)acrylate, tert-butyl (meth)acrylate, 2-ethylhexyl (meth)acrylate, isooctyl (meth)acrylate, isomyristyl (meth)acrylate, stearyl (meth)acrylate, "isostearyl acrylate" (available from OSAKA ORGANIC CHEMICAL INDUSTRY LTD., trade name), lauryl (meth)acrylate, tridecyl (meth)acrylate, tetrahydrofurfuryl (meth)acrylate, cyclohexyl (meth)acrylate, and isobornyl (meth)acrylate.

(3) Alkoxysilyl Group-Containing Polymerizable Unsaturated Monomer

The alkoxysilyl group-containing polymerizable unsaturated monomer is a compound having one or more alkoxysilyl groups and one or more polymerizable unsaturated bonds per molecule. Examples of the alkoxysilyl group-containing polymerizable unsaturated monomer include vinyltrimethoxysilane, vinyltriethoxysilane, acryloxyethyl trimethoxysilane, methacryloxyethyl trimethoxysilane, acryloxypropyl trimethoxysilane, methacryloxypropyl trimethoxysilane, acryloxypropyl triethoxysilane, methacryloxypropyl triethoxysilane, and vinyltris(β-methoxyethoxy)silane.

As the alkoxysilyl group-containing polymerizable unsaturated monomer, vinyltrimethoxysilane, γ-acryloxypropyl trimethoxysilane, and γ-methacryloxypropyl trimethoxysilane are preferable, and γ-methacryloxypropyl trimethoxysilane is more preferable, from the viewpoints of scratch resistance and the like of the coating film to be formed.

Among these, preferable examples of the alkoxysilyl group-containing polymerizable unsaturated monomer include vinyltrimethoxysilane, γ-acryloxypropyl trimethoxysilane, and γ-methacryloxypropyl trimethoxysilane.

As the alkoxysilyl group-containing polymerizable unsaturated monomer, its commercially available products can be used. Examples of its commercially available products include "KBM-1003", "KBE-1003", "KBM-502", "KBM-503", "KBE-502", "KBE-503", "KBM-5103", and "KBM-5803" (all available from Shin-Etsu Chemical Co., Ltd.), "Y-9936, and "A-174" (all available from Momentive Performance Materials Japan LLC), and "OFS-6030" and "Z-6033" (all available from Dow Corning Toray Co., Ltd.).

When the alkoxysilyl group-containing polymerizable unsaturated monomer is used as a constituent component, in addition to the crosslinking bond between the hydroxyl group and the crosslinking agent (B), crosslinking bonds are formed by a condensation reaction between alkoxysilyl groups and a reaction between an alkoxysilyl group and a hydroxyl group, so that the scratch resistance, curability, and the like of the coating film to be formed can be improved.

In a case where the alkoxysilyl group-containing polymerizable unsaturated monomer is used as a constituent component, a compounding proportion thereof is preferably 3 to 60 mass %, more preferably 5 to 50 mass %, and particularly preferably 5 to 30 mass %, with respect to the total amount of the monomer components, from the viewpoints of scratch resistance, curability, and the like of the coating film to be formed.

(4) Aromatic Vinyl Monomer

Specific examples of the aromatic vinyl monomer include styrene, α-methylstyrene, and vinyltoluene.

When the aromatic vinyl monomer is used as a constituent component, a glass transition temperature of the resin obtained is increased, and a hydrophobic coating film having a high refractive index can be obtained, so that it is possible to achieve an improvement effect of the finished appearance of the coating film due to increase of its gloss.

In a case where the aromatic vinyl monomer is used as a constituent component, a compounding proportion thereof is preferably in a range of 3 to 50 mass %, particularly 5 to 40 mass %, with respect to the total amount of the monomer components.

(5) Glycidyl Group-Containing Polymerizable Unsaturated Monomer

The glycidyl group-containing polymerizable unsaturated monomer is a compound having one or more glycidyl groups and one or more polymerizable unsaturated bonds per molecule, and specific examples thereof include glycidyl acrylate and glycidyl methacrylate.

(6) Polymerizable Unsaturated Bond-Containing and Nitrogen Atom-Containing Compound Examples thereof include (meth)acrylamide, N,N-dimethyl (meth)acrylamide, N-[3-(dimethylamino)propyl](meth)acrylamide, N-butoxymethyl (meth)acrylamide, diacetone (meth)acrylamide, N,N-dimethylaminoethyl (meth)acrylate, vinylpyridine, vinylimidazole, acrylonitrile, and methacrylonitrile.

(7) Polysiloxane Chain-Containing Polymerizable Unsaturated Monomer

The polysiloxane chain-containing polymerizable unsaturated monomer is a compound having one or more polysiloxane chains and one or more polymerizable unsaturated bonds per molecule. Specific examples thereof include a siloxane group-containing mono(meth)acrylate monomer.

As the polysiloxane chain-containing polymerizable unsaturated monomer, its commercially available products can be used. Examples of its commercially available products include "Silaplane FM-0721", "Silaplane FM-0711", "Silaplane FM-0725" (all available from JNC CORPORATION), "X-22-174ASX", "X-22-174BX", "KF-2012", "X-22-2426", "X-22-2404", and "X-22-2475" (all available from Shin-Etsu Chemical Co., Ltd.).

(8) Other Vinyl Compounds

Examples of the other vinyl compounds include vinyl acetate, vinyl propionate, vinyl chloride, and versatic acid vinyl ester. Examples of the versatic acid vinyl ester include commercially available products "VeoVa 9" and "VeoVa 10" (trade names, available from Mitsubishi Chemical Corporation).

As the other polymerizable unsaturated monomers, one type or two or more types of the monomers described in (1) to (8) can be used.

In the present invention, the polymerizable unsaturated monomer refers to a monomer having one or more (for example, 1 to 4) polymerizable unsaturated groups. The polymerizable unsaturated group means an unsaturated group that is radically polymerizable. Examples of such polymerizable unsaturated groups include a vinyl group, a (meth)acryloyl group, a (meth)acrylamide group, a vinyl ether group, an allyl group, a propenyl group, an isopropenyl group, and a maleimide group.

In addition, in the present specification, "(meth)acrylate" means an acrylate or a methacrylate. "(meth)acrylic acid" means acrylic acid or methacrylic acid. In addition, "(meth)acryloyl" means acryloyl or methacryloyl. Furthermore, "(meth)acrylamide" means acrylamide or methacrylamide.

From the viewpoints of curability, water resistance, and the like of the coating film to be obtained, the hydroxyl group-containing acrylic resin (A1) has a hydroxyl value in a range of preferably 70 to 200 mg KOH/g, particularly preferably 80 to 185 mg KOH/g, and more particularly preferably 100 to 170 mg KOH/g.

In addition, the hydroxyl group-containing acrylic resin (A1) has a weight average molecular weight in a range of preferably 2000 to 50000, particularly preferably 3000 to 30000, and more particularly preferably 4000 to 10000, from the viewpoints of finished appearance, curability, and the like of the coating film to be obtained.

Note that in the present specification, the average molecular weight is a value calculated from a chromatogram measured by a gel permeation chromatograph calibrated with the molecular weight of standard polystyrene. For the gel permeation chromatograph, "HLC8120 GPC" (available from Tosoh Corporation) is used. The gel permeation chromatography is performed using four columns "TSKgel G-4000HXL", "TSKgel G-3000HXL", "TSKgel G-2500HXL", and "TSKgel G-2000HXL" (all available from Tosoh Corporation, trade names) under conditions of a mobile phase of tetrahydrofuran, a measurement temperature of a flow rate of 1 mL/min, and a detector of RI.

In addition, the hydroxyl group-containing acrylic resin (A1) has a glass transition temperature in a range of preferably −50 to 60° C., particularly preferably 10 to 50° C., and more particularly preferably 20 to 45° C., from the viewpoints of hardness, finished appearance, and the like of the coating film.

In the present specification, the glass transition temperature (° C.) of the acrylic resin was calculated by the following equations.

$$1/Tg\ (K) = W1/T1 + W2/T2 + \ldots Wn/Tn$$

$$Tg\ (°\ C.) = Tg\ (K) - 273$$

where W1, W2, ... Wn are mass fractions of the respective monomers, and T1, T2, ... Tn are glass transition temperatures Tg (K) of homopolymers of the respective monomers.

Note that the glass transition temperatures of the homopolymers of the respective monomers each are a value in accordance with POLYMER HANDBOOK Fourth Edition, edited by J. Brandrup, E. h. Immergut, E. A. Grulke (1999), and the glass transition temperature of a monomer not described in this literature is a value obtained by synthesizing a homopolymer of the monomer to have a weight average molecular weight of about 50000 and measuring the glass transition temperature of the homopolymer using "DSC220U" (differential scanning calorimeter) available from Seiko Instruments Inc. The measurement was carried out by weighing a predetermined amount of the sample of 50 mg into a dedicated sample dish, drying the sample at 130° C. for 3 hours, then raising the temperature from −50° C. to 150° C. at a rate of in an inert gas, and reading the temperature at an inflection point of the obtained heat flow curve.

In addition, the hydroxyl group-containing acrylic resin (A1) has an acid value in a range of preferably 0.5 to 15 mg KOH/g and particularly preferably 1 to 10 mg KOH/g from the viewpoints of scratch resistance, water resistance, curability, and the like of the coating film to be obtained.

A copolymerization method for providing the hydroxyl group-containing acrylic resin (A1) by copolymerizing the monomer mixture is not particularly limited, and known copolymerization methods can be used. Among them, it is possible to suitably use a solution polymerization method in which polymerization is performed in an organic solvent in the presence of a polymerization initiator.

Examples of the organic solvent used in the solution polymerization method include: aromatic solvents such as toluene, xylene, and "Swasol 1000" (available from Cosmo Oil Co., Ltd., trade name, high boiling point petroleum-based solvent); ester-based solvents such as ethyl acetate, butyl acetate, propyl propionate, butyl propionate, 1-methoxy-2-propyl acetate, 2-ethoxyethyl propionate, 3-methoxybutyl acetate, ethylene glycol ethyl ether acetate, and propylene glycol methyl ether acetate; ketone-based solvents such as methyl ethyl ketone, methyl isobutyl ketone, and methyl amyl ketone; and alcohol-based solvents such as 1-propanol, 2-propanol, 1-butanol, 2-butanol, isobutylalcohol, and 2-ethyl hexanol.

These organic solvents can be used alone or in combination of two or more thereof, but it is preferable to use an ester-based solvent or a ketone-based solvent from the viewpoint of solubility of the acrylic resin. Furthermore, an aromatic solvent may be suitably used in combination.

Examples of the polymerization initiator that can be used in the copolymerization of the hydroxyl group-containing acrylic resin (A1) include known radical polymerization initiators such as 2,2'-azobisisobutyronitrile, benzoyl peroxide, di-t-butyl peroxide, di-t-amyl peroxide, t-butyl peroctoate, 2,2'-azobis(2-methylbutyronitrile), and 2,2'-azobis(2,4-dimethylvaleronitrile).

The hydroxyl group-containing acrylic resins (A1) may be used alone or in combination of two or more thereof.

The hydroxyl group-containing acrylic resin (A1) preferably contains a secondary hydroxyl group-containing acrylic resin (A1') from the viewpoints of finished appearance and the like of the coating film to be formed.

The secondary hydroxyl group-containing acrylic resin (A1') can be produced, for example, by using a secondary hydroxyl group-containing polymerizable unsaturated monomer as one of the hydroxyl group-containing polymerizable unsaturated monomers in the method for producing the hydroxyl group-containing acrylic resin (A1).

Examples of the secondary hydroxyl group-containing polymerizable unsaturated monomer include: secondary hydroxyl group-containing polymerizable unsaturated monomers in which the number of carbon atoms of the alkyl group of the ester moiety is from 2 to 8, preferably from 3 to 6, and more preferably 3 or 4, such as 2-hydroxypropyl (meth)acrylate, 2-hydroxybutyl (meth)acrylate, and 3-hydroxybutyl (meth)acrylate; and adducts of (meth)acrylic acid and an epoxy group-containing compound (for example, "Cardura E10P" (trade name, available from Hexion Co., Ltd., glycidyl neodecanoate). These can be used alone or in combination of two or more types. Among them, 2-hydroxypropyl (meth)acrylate can be suitably used from the viewpoints of the finished appearance and the like of the coating film to be formed.

In a case where the secondary hydroxyl group-containing polymerizable unsaturated monomer is used in the production of the secondary hydroxyl group-containing acrylic resin (A1'), the amount of the secondary hydroxyl group-containing polymerizable unsaturated monomer used is in a range of preferably 15 to 45 mass %, particularly preferably 20 to 40 mass %, with respect to the total amount of the copolymerizable monomer components, from the viewpoints of the finished appearance and the like of the coating film to be formed.

In addition, in the secondary hydroxyl group-containing acrylic resin (A1'), a content ratio of the secondary hydroxyl group-containing polymerizable unsaturated monomer in the total amount of the hydroxyl group-containing polymerizable unsaturated monomers is suitably in a range of 50 to 100 mass %, preferably 55 to 100 mass %, and more preferably 60 to 100 mass %, from the viewpoints of water resistance, finished appearance, and the like of the coating film to be formed.

Furthermore, the hydroxyl group-containing acrylic resin (A1) preferably contains an acrylic resin (A1") having a hydroxyl group and an alkoxysilyl group from the viewpoints of scratch resistance and the like of the coating film to be formed.

The acrylic resin (A1") having a hydroxyl group and an alkoxysilyl group can be produced, for example, by using the alkoxysilyl group-containing polymerizable unsaturated monomer (3) as one of the other polymerizable unsaturated monomers in the method for producing the hydroxyl group-containing acrylic resin (A1).

In a case where the alkoxysilyl group-containing polymerizable unsaturated monomer is used in the production of the acrylic resin (A1") having a hydroxyl group and an alkoxysilyl group, an amount of the alkoxysilyl group-containing polymerizable unsaturated monomer used is preferably 3 to 60 mass %, more preferably 5 to 50 mass %, and particularly preferably 5 to 30 mass %, based on the total amount of the copolymerizable monomer components, from the viewpoints of scratch resistance, finished appearance, and the like of the coating film to be formed.

In addition, the hydroxyl group-containing acrylic resin (A1) preferably contains an acrylic resin (A1''') having a secondary hydroxyl group and an alkoxysilyl group as the secondary hydroxyl group-containing acrylic resin (A1') or the acrylic resin (A1") having a hydroxyl group and an alkoxysilyl group from the viewpoints of scratch resistance, finished appearance, and the like of the coating film to be formed.

The acrylic resin (A1''') having a secondary hydroxyl group and an alkoxysilyl group can be produced, for example, by using the alkoxysilyl group-containing polymerizable unsaturated monomer (3) as one of the other polymerizable unsaturated monomers in the method for producing the secondary hydroxyl group-containing acrylic resin (A1').

In a case where the secondary hydroxyl group-containing polymerizable unsaturated monomer is used in the production of the acrylic resin (A1''') having a secondary hydroxyl group and an alkoxysilyl group, an amount of the secondary hydroxyl group-containing polymerizable unsaturated monomer used is in a range of suitably 15 to 45 mass %, particularly 20 to 40 mass %, with respect to the total amount of the copolymerizable monomer components from the viewpoint of finished appearance of the coating film to be formed.

In addition, in the acrylic resin (A1''') having a secondary hydroxyl group and an alkoxysilyl group, a content ratio of the secondary hydroxyl group-containing polymerizable unsaturated monomer in the total amount of the hydroxyl group-containing polymerizable unsaturated monomers is in a range of suitably 50 to 100 mass %, particularly 55 to 100 mass %, and more particularly 60 to 100 mass % from the viewpoints of water resistance, finished appearance, and the like of the coating film to be formed.

In a case where the alkoxysilyl group-containing polymerizable unsaturated monomer is used in the production of the acrylic resin (A1''') having a secondary hydroxyl group and an alkoxysilyl group, an amount of the alkoxysilyl group-containing polymerizable unsaturated monomer used is in a range of preferably 3 to 60 mass %, more preferably 5 to 50 mass %, and particularly preferably 5 to 30 mass %, with respect to the total amount of the copolymerizable monomer components, from the viewpoints of scratch resistance, finished appearance, and the like of the coating film to be formed.

In a case where the hydroxyl group-containing resin (A) contains the hydroxyl group-containing acrylic resin (A1) in the coating composition of the present invention, a content of the hydroxyl group-containing acrylic resin (A1) is in a range of suitably 40 to 95 parts by mass, particularly 50 to 85 parts by mass, and more particularly 55 to 75 parts by mass, based on 100 parts by mass of the total resin solid contents in the coating composition from the viewpoints of scratch resistance, water resistance, finished appearance, and the like of the coating film to be formed.

In a case where the hydroxyl group-containing resin (A) contains the hydroxyl group-containing acrylic resin (A1) in the coating composition of the present invention, a content of the hydroxyl group-containing acrylic resin (A1) is in a range of suitably 40 to 95 parts by mass, particularly 50 to 85 parts by mass, and more particularly 55 to 75 parts by mass, based on 100 parts by mass of the total solid contents of the hydroxyl group-containing resin (A) and the crosslinking agent (B), from the viewpoints of scratch resistance, water resistance, finished appearance, and the like of the coating film to be formed.

Furthermore, the coating composition of the present invention can contain a film-forming resin other than the hydroxyl group-containing acrylic resin (A1). Examples of the film-forming resin other than the hydroxyl group-containing acrylic resin (A1) include hydroxyl group-free acrylic resins, hydroxyl group-containing or hydroxyl group-free polyester resins, hydroxyl group-containing or hydroxyl group-free polyether resins, and hydroxyl group-containing or hydroxyl group-free polyurethane resins. Among them, preferable examples of the film-forming resin include hydroxyl group-containing polyester resins and hydroxyl group-containing polyurethane resins.

The hydroxyl group-containing polyester resin can be produced by a common method, for example, by an esterification reaction between a polybasic acid and a polyhydric alcohol. The polybasic acid is a compound having two or more carboxyl groups per molecule, and examples thereof include phthalic acid, isophthalic acid, terephthalic acid, succinic acid, adipic acid, azelaic acid, sebacic acid, tetrahydrophthalic acid, hexahydrophthalic acid, maleic acid, fumaric acid, itaconic acid, trimellitic acid, pyromellitic acid, and anhydrides thereof. The polyhydric alcohol is a compound having two or more hydroxyl groups per molecule and examples thereof include diols such as ethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxypivalic acid neopentyl glycol ester, 2-butyl-2-ethyl-1,3-propanediol, 3-methyl-1,5-pentanediol, 2,2,4-trimethylpentanediol, and hydrogenated bisphenol A; trihydric or higher polyol components such as trimethylolpropane, trimethylolethane, glycerin, and pentaerythritol; and hydroxycarboxylic acids such as 2,2-dimethylolpropionic acid, 2,2-dimethylolbutanoic acid, 2,2-dimethylolpentanoic acid, 2,2-dimethylolhexanoic acid, and 2,2-dimethyloloctanoic acid.

Furthermore, α-olefin epoxides such as propylene oxide and butylene oxide, monoepoxy compounds such as "Cardura E10P" (available from Hexion, trade name, glycidyl ester of synthetic highly branched saturated fatty acid), and the like may be reacted with acids to introduce these compounds into polyester resins.

In a case of introducing a carboxyl group into a polyester resin, for example, the carboxyl group can be introduced by adding an acid anhydride to a hydroxyl group-containing polyester to perform half-esterification.

The hydroxyl group-containing polyester resin has a hydroxyl value in a range of preferably 80 to 250 mg KOH/g and more preferably 100 to 200 mg KOH/g. The hydroxyl group-containing polyester resin has a weight average molecular weight in a range of preferably 500 to 3500 and more preferably in a range of 500 to 2500.

Examples of the hydroxyl group-containing polyurethane resin include a hydroxyl group-containing polyurethane resin obtained by reacting a polyol compound with a polyisocyanate compound.

Examples of the polyol compound having a low molecular weight include dihydric alcohols such as ethylene glycol, diethylene glycol, propylene glycol, butylene glycol, and hexamethylene glycol; trihydric alcohols such as trimethylolpropane and glycerin; and tetrahydric alcohols such as pentaerythritol. Examples of the polyol compound having a high molecular weight include polyether polyol, polyester polyol, acrylic polyol, and epoxy polyol. Examples of the polyether polyol include polyethylene glycol, polypropylene glycol, and polytetramethylene glycol. Examples of the polyester polyol include a polycondensation product of an alcohol such as the above-mentioned dihydric alcohol, dipropylene glycol, 1,4-butanediol, 1,6-hexanediol, or neopentyl glycol and a dibasic acid such as adipic acid, azelaic acid, or sebacic acid; a lactone-based ring-opened polymer polyol such as polycaprolactone; and a polycarbonate diol. Furthermore, carboxyl group-containing polyols such as 2,2-dimethylol propionic acid and 2,2-dimethylol butanoic acid can also be used.

As the polyisocyanate compound to be reacted with the polyol compound, for example, polyisocyanate compounds described in a section of the crosslinking agent (B) to be described below can be used.

The hydroxyl group-containing polyurethane resin has a hydroxyl value in a range of preferably 80 to 250 mg KOH/g and more preferably 100 to 200 mg KOH/g. The hydroxyl group-containing polyurethane resin has a weight average molecular weight in a range of preferably 500 to 10000 and more preferably 1000 to 5000.

In a case where the hydroxyl group-containing acrylic resin (A1) and a resin other than the hydroxyl group-containing acrylic resin (A1) (more specifically, a polyester resin, a polyurethane resin, a polyether resin, or the like) are used in combination as the film-forming resin, a content of the resin other than the hydroxyl group-containing acrylic resin (A1) is suitably 50 parts by mass or less, particularly 1 to 20 parts by mass, with respect to 100 parts by mass of the solid content of the hydroxyl group-containing acrylic resin (A1).

In the coating composition of the present invention, a content of the hydroxyl group-containing resin (A) is in a range of suitably 40 to 95 parts by mass, particularly 50 to 85 parts by mass, and more particularly 55 to 75 parts by mass, based on 100 parts by mass of the total resin solid contents in the coating composition, from the viewpoints of scratch resistance, water resistance, finished appearance, and the like of the coating film to be formed.

In the coating composition of the present invention, the content of the hydroxyl group-containing resin (A) is in a range of suitably 40 to 95 parts by mass, particularly 50 to 85 parts by mass, more particularly 55 to 75 parts by mass, based on 100 parts by mass of the total solid contents of the hydroxyl group-containing resin (A) and the crosslinking agent (B), from the viewpoints of scratch resistance, water resistance, finished appearance, and the like of the coating film to be formed.

Crosslinking Agent (B)

The crosslinking agent (B) is a compound having a functional group that is reactive with a hydroxyl group in the hydroxyl group-containing resin (A).

As the crosslinking agent (B), specifically, for example, a polyisocyanate compound, a blocked polyisocyanate compound, an amino resin, or the like is suitably used. Among them, the crosslinking agent (B) preferably contains a polyisocyanate compound and/or an amino resin, and particularly preferably contains a polyisocyanate compound, from the viewpoints of scratch resistance, finished appearance, and the like of the coating film to be formed.

The polyisocyanate compound is a compound having at least two isocyanate groups per molecule, and examples thereof include aliphatic polyisocyanate compounds, alicyclic polyisocyanate compounds, aromatic-aliphatic polyisocyanate compounds, aromatic polyisocyanate compounds, and derivatives of the polyisocyanate compounds.

Examples of the aliphatic polyisocyanate compounds include: aliphatic diisocyanate compounds, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); and aliphatic triisocyanate compounds, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of the alicyclic polyisocyanate compounds include: alicyclic diisocyanate compounds, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or its mixture, methylenebis(4,1-cyclohexanediyl) diisocyanate (common name: hydrogenated MDI), and norbornane diisocyanate; and alicyclic triisocyanate compounds, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane, and 6-(2-isocyanatoethyl)-2-isocyanatomethyl-2-(3-isocyanatopropyl)-bicyclo(2.2.1)heptane.

Examples of the aromatic-aliphatic polyisocyanate compounds include: aromatic-aliphatic diisocyanate compounds, such as methylenebis(4,1-phenylene) diisocyanate (common name: MDI), 1,3- or 1,4-xylylene diisocyanate or its mixture, ω,ω'-diisocyanato-1,4-diethylbenzene, and 1,3- or 1,4-bis(1-isocyanato-1-methylethyl)benzene (common name: tetramethylxylylene diisocyanate) or its mixture; and aromatic-aliphatic triisocyanate compounds, such as 1,3,5-triisocyanatomethylbenzene.

Examples of the aromatic polyisocyanate compounds include: aromatic diisocyanate compounds, such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI) or its mixture, 4,4'-toluidine diisocyanate, and 4,4'-diphenyl ether diisocyanate; aromatic triisocyanate compounds, such as triphenylmethane-4,4',4''-triisocyanate, 1,3,5-triisocyanatobenzene, and 2,4,6-triisocyanatotoluene; and aromatic tetraisocyanate compounds, such as 4,4'-diphenylmethane-2,2',5,5'-tetraisocyanate.

In addition, examples of the derivatives of the polyisocyanate compounds include dimers, trimers, biuret, allophanate, uretdione, uretoimine, isocyanurates, oxadiazinetrione, polymethylene polyphenyl polyisocyanates (crude MDI and polymeric MDI), and crude TDI of the polyisocyanate compounds described above.

The polyisocyanate compounds and their derivatives may each be used alone or in combination of two or more types.

As the polyisocyanate compound, it is preferable to use at least one selected from aliphatic polyisocyanate compounds, alicyclic polyisocyanate compounds, and derivatives thereof from the viewpoints of weather resistance and the like of the coating film to be formed, and it is more preferable to use an aliphatic polyisocyanate compound and/or a derivative thereof from the viewpoints of increasing the solid content of the resulting coating composition, and finished appearance, scratch resistance, and the like of the coating film to be formed.

As the aliphatic polyisocyanate compound and/or the derivative thereof, among them, it is preferable to use an aliphatic diisocyanate compound and/or an isocyanurate thereof, and it is more preferable to use hexamethylene diisocyanate and/or an isocyanurate thereof, from the viewpoints of increasing the solid content of the resulting coating composition, and finished appearance, scratch resistance, and the like of the coating film to be formed.

In a case where the coating composition of the present invention contains the polyisocyanate compound as the crosslinking agent (B), the content ratio of the polyisocyanate compound is in a range of suitably 5 to 60 parts by mass, preferably 15 to 50 parts by mass, and more preferably 25 to 45 parts by mass, based on 100 parts by mass of the total solid contents of the hydroxyl group-containing resin (A) and the crosslinking agent (B), from the viewpoints of finished appearance, scratch resistance, and the like of the coating film to be formed.

In addition, the blocked polyisocyanate compound that can be used as the crosslinking agent (B) is a compound formed by blocking an isocyanate group in the polyisocyanate compound with a blocking agent.

Examples of the blocking agent include: phenolic compounds, such as phenol, cresol, xylenol, nitrophenol, ethylphenol, hydroxydiphenyl, butylphenol, isopropylphenol, nonylphenol, octylphenol, and methyl hydroxybenzoate; lactam-based compounds, such as ε-caprolactam, δ-valerolactam, γ-butyrolactam, and β-propiolactam; aliphatic alcohol-based compounds, such as methanol, ethanol, propyl alcohol, butyl alcohol, amyl alcohol, and lauryl alcohol; ether-based compounds, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohol-based compounds, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oxime-based compounds, such as formamide oxime, acetoamide oxime, acetoxime, methyl ethyl ketoxime, diacetyl monoxime, benzophenone oxime, and cyclohexane oxime; active methylene-based compounds, such as dimethyl malonate, diethyl malonate, ethyl acetoacetate, methyl acetoacetate, and acetylacetone; mercaptan-based compounds, such as butyl mercaptan, t-butyl mercaptan, hexyl mercaptan, t-dodecyl mercaptan, 2-mercaptobenzothiazole, thiophenol, methylthiophenol, and ethylthiophenol; acid amide-based compounds, such as acetanilide, acetanisidide, acetotoluide, acrylamide, methacrylamide, acetic amide, stearic amide, and benzamide; imide-based compounds, such as succinimide, phthalimide, and maleimide; amine-based compounds, such as diphenylamine, phenylnaphthylamine, xylidine, N-phenylxylidine, carbazole, aniline, naphthylamine, butylamine, dibutylamine, and butylphenylamine; imidazole-based compounds, such as imidazole and 2-ethylimidazole; urea-based compounds, such as urea, thiourea, ethyleneurea, ethylenethiourea, and diphenylurea; carbamic ester-based compounds, such as phenyl N-phenylcarbamate; imine-based compounds, such as ethyleneimine and propyleneimine; sulfite-based compounds, such as sodium bisulfite and potassium bisulfite; and azole-based compounds. Examples of the azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

Among them, preferred examples of the blocking agent include oxime-based blocking agents, active methylene-based blocking agents, and pyrazole or pyrazole derivatives.

When the polyisocyanate compound is blocked (the polyisocyanate compound is reacted with a blocking agent), a solvent can be added as necessary to perform blocking. The solvent used in the blocking reaction is preferably a solvent not reactive with an isocyanate group, and examples include ketones, such as acetone and methyl ethyl ketone; esters, such as ethyl acetate; and a solvent such as N-methyl-2-pyrrolidone (NMP).

In a case where the coating composition of the present invention contains the blocked polyisocyanate compound as the crosslinking agent (B), a content ratio of the blocked polyisocyanate compound is in a range of suitably 5 to 60 parts by mass, particularly 15 to 50 parts by mass, and more particularly 25 to 45 parts by mass, based on 100 parts by mass of the total solid contents of the hydroxyl group-containing resin (A) and the crosslinking agent (B), from the viewpoints of finished appearance, scratch resistance, and the like of the coating film to be formed.

In a case where the coating composition of the present invention contains the polyisocyanate compound and/or the blocked polyisocyanate compound as the crosslinking agent (B), as the compounding ratio thereof, an equivalent ratio (NCO/OH) of the total isocyanate groups (including a blocked isocyanate group) of the polyisocyanate compound and the blocked polyisocyanate compound to the hydroxyl group of the hydroxyl group-containing resin (A) is in a range of typically 0.5 to 2, particularly suitably 0.8 to 1.5, from the viewpoints of water resistance, finished appearance, and the like of the coating film to be formed.

As the amino resin that can be used as the crosslinking agent (B), a partially methylolated amino resin or a completely methylolated amino resin obtained by reaction between an amino component and an aldehyde component can be used. Examples of the amino component include melamine, urea, benzoguanamine, acetoguanamine, steroguanamine, spiroguanamine, and dicyandiamide. Examples of the aldehyde component include formaldehyde, paraformaldehyde, acetaldehyde, and benzaldehyde.

A compound obtained by partially or completely etherifying methylol groups of the methylolated amino resin with an appropriate alcohol can be also used. Examples of the alcohol used for the etherification include methyl alcohol, ethyl alcohol, n-propyl alcohol, isopropyl alcohol, n-butyl alcohol, isobutyl alcohol, 2-ethylbutanol, and 2-ethylhexanol.

As the amino resin, a melamine resin is preferable. As the melamine resin, for example, an alkyl-etherified melamine resin obtained by partially or completely etherifying methylol groups of a partially or completely methylolated melamine resin with the alcohol can be used.

As the alkyl-etherified melamine resin, for example, a methyl-etherified melamine resin obtained by partially or completely etherifying methylol groups of a partially or completely methylolated melamine resin with methyl alcohol; a butyl-etherified melamine resin obtained by partially or completely etherifying methylol groups of a partially or completely methylolated melamine resin with butyl alcohol; and a methyl-butyl mixed etherified melamine resin obtained by partially or completely etherifying methylol groups of a partially or completely methylolated melamine resin with methyl alcohol and butyl alcohol can be suitably used.

The melamine resin preferably has a weight average molecular weight in a range of suitably 400 to 6000, particularly 500 to 5000, and more particularly 800 to 4000.

As the melamine resin, its commercially available products can be used. Examples of the commercially available products of the melamine resins include: "CYMEL 202", "CYMEL 203", "CYMEL 238", "CYMEL 251", "CYMEL 303", "CYMEL 323", "CYMEL 324", "CYMEL 325", "CYMEL 327", "CYMEL 350", "CYMEL 385", "CYMEL 1156", "CYMEL 1158", "CYMEL 1116", and "CYMEL 1130" (all available from Allnex Japan Inc.); and "U-VAN 120", "U-VAN 20HS", "U-VAN 20SE60", "U-VAN 2021", "U-VAN 2028", and "U-VAN 28-60" (all available from Mitsui Chemicals, Inc.).

The melamine resins described above can be used alone or in combination of two or more types.

In a case where the coating composition of the present invention contains the amino resin as the crosslinking agent (B), a compounding ratio thereof is in a range of suitably 5 to 60 parts by mass, particularly 15 to 50 parts by mass, and more particularly 25 to 45 parts by mass, based on 100 parts by mass of the total solid contents of the hydroxyl group-containing resin (A) and the crosslinking agent (B), from the viewpoints of transparency, water resistance, finished appearance, and the like of the coating film to be formed.

The crosslinking agents (B) can be used alone or in combination of two or more types.

Dispersion of Silica Particles (C)

The dispersion of silica particles (C) is a dispersion of silica particles having a hydroxyl group-containing acrylic resin (c1) bonded thereto and having an ultraviolet absorber (c21) and/or a hindered amine-based light stabilizer (c22) bonded thereto. Hereinafter, the dispersion of silica particles (C) will be described in more detail.

Raw Silica Particles

As raw silica particles for forming the dispersion of silica particles (C), any silica particles can be used without limitation, as long as the silica particles can form bonds with the hydroxyl group-containing acrylic resin (c1) and the ultraviolet absorber (c21) and/or the hindered amine-based light stabilizer (c22). Examples of such silica particles include dry silica, wet silica, silica gel, calcium ion-exchanged silica fine particles, and colloidal silica, and colloidal silica which is silica fine particles having a hydroxyl group and/or an alkoxy group on the particle surface and dispersed in a dispersion medium is preferable.

Examples of the dispersion medium include: water; alcohol-based solvents such as methanol, ethanol, isopropanol, n-propanol, isobutanol, and n-butanol; polyhydric alcohol-based solvents such as ethylene glycol; polyhydric alcohol derivatives such as ethylene glycol monoethyl ether, ethylene glycol monobutyl ether, and propylene glycol monomethyl ether; and ketone-based solvents such as methyl ethyl ketone, methyl isobutyl ketone, and diacetone alcohol. As the dispersion medium, a lower alcohol-based solvent or a lower polyhydric alcohol derivative having 3 or less carbon atoms is preferable. This is because the dispersion medium is easily removed in a solvent removal process in the production of the polymerizable unsaturated group-containing silica particles (c1-i).

Examples of the colloidal silica include methanol silica sol, IPA-ST, MEK-ST, NBA-ST, XBA-ST, DMAC-ST, PGM-ST, ST-UP, ST-OUP, ST-20, ST-40, ST-C, ST-N, ST-O, ST-50, and ST-OL (all available from Nissan Chemical Industries, Ltd.).

The raw silica particles preferably have an average primary particle size of 5 to 100 nm and more preferably 5 to 50 nm. When the average primary particle size is less than 5 nm, in a case where the dispersion is mixed with other organic materials and used, an improvement effect of mechanical properties and the like may be reduced. When the average primary particle size exceeds 100 nm, transparency may be impaired.

As used herein, the term "average primary particle size" refers to a median diameter (d50) of volume-based particle size distribution, which is measured by a laser diffraction/scattering method. In the present invention, volume-based particle size distribution of the present dispersion is measured using a laser diffraction/scattering particle size distribution analyzer "Microtrac NT3300" (trade name, available from Nikkiso Co., Ltd.). At this time, the sample concentration is adjusted to have a transmittance falling within a predetermined range set in the analyzer.

The dispersion of silica particles (C) is a dispersion of silica particles obtained by bonding, to the raw silica particles, the hydroxyl group-containing acrylic resin (c1), and the ultraviolet absorber (c21) and/or the hindered amine-based light stabilizer (c22), and hereinafter, the hydroxyl group-containing acrylic resin (c1), the ultraviolet absorber (c21), and the hindered amine-based light stabilizer (c22) which are constituents thereof will be described, and then an aspect of bonding between these constituents and the silica particles will be described.

Hydroxyl Group-Containing Acrylic Resin (c-1)

The hydroxyl group-containing acrylic resin (c1) can be formed by polymerizing a hydroxyl group-containing polymerizable unsaturated monomer.

The hydroxyl group-containing polymerizable unsaturated monomer is a compound having one or more hydroxyl groups and one or more polymerizable unsaturated groups per molecule, and examples of the hydroxyl group-containing polymerizable unsaturated monomer include: monoesterified products of a (meth)acrylic acid and a dihydric alcohol having 2 to 8 carbon atoms, such as 2-hydroxyethyl (meth)acrylate, 2-hydroxypropyl (meth)acrylate, 3-hydroxypropyl (meth)acrylate, or 4-hydroxybutyl (meth)acrylate; ε-caprolactone modified products of the monoesterified products of (meth)acrylic acid and a dihydric alcohol having 2 to 8 carbon atoms; adducts of (meth)acrylic acid and an epoxy group-containing compound (e.g., "Cardura EI OP" (trade name), available from Hexion, glycidyl neodecaoate); N-hydroxymethyl (meth)acrylamide; allyl alcohols; and (meth)acrylates having a polyoxyethylene chain with a hydroxyl group at the molecular terminal.

In the formation of the hydroxyl group-containing acrylic resin (c1), similar to the case of the hydroxyl group-containing acrylic resin (A1) as the hydroxyl group-containing resin (A), another polymerizable unsaturated monomer that is copolymerizable with the hydroxyl group-containing polymerizable unsaturated monomer may be added to be copolymerized with the hydroxyl group-containing polymerizable unsaturated monomer. Examples of such other polymerizable unsaturated monomers include the specific examples (1) to (8) of the compound having one or more polymerizable unsaturated groups per molecule as described in relation to the hydroxyl group-containing acrylic resin (A1).

Ultraviolet Absorber (c21)

As the ultraviolet absorber (c21), an ultraviolet absorber that has been known in the art can be used, and for example, a benzotriazole-based absorber, a triazine-based absorber, a salicylic acid derivative-based absorber, or a benzophenone-based absorber can be used. In addition, the ultraviolet absorber (c21) may have a polymerizable unsaturated group.

Specific examples of the benzotriazole-based absorber include 2-(2'-hydroxy-5'-methylphenyl)benzotriazole, 2-(2'-hydroxy-5'-t-butylphenyl)benzotriazole, 2-(2'-hydroxy-3', 5'-di-t-butylphenyl)benzotriazole, 2-(2'-hydroxy-3'-t-butyl-5'-methylphenyl)-5-chlorobenzotriazole, 2-(2'-hydroxy-3', 5'-di-t-butylphenyl)-5-chlorobenzotriazole, 2-(2'-hydroxy-3',5'-di-t-amylphenyl)benzotriazole, 2-(2'-hydroxy-4'-octoxyphenyl)benzotriazole, 2-{2'-hydroxy-3'-(3",4",5",6"-tetrahydrophthalimidomethyl)-5'-methylphenyl}benzotriazole, and 2-[2-hydroxy-5-[2-(methacryloyloxy)ethyl]phenyl]-2H-benzotriazole.

Specific examples of the triazine-based absorber include 2,4-bis(2,4-dimethylphenyl)-6-(2-hydroxy-4-isooctyloxyphenyl)-1,3,5-triazine, 2-[4((2-hydroxy-3-dodecyloxypropyl)-oxy)-2-hydroxyphenyl]-4,6-bis(2,4-dimethylphenyl)-1,3,5-triazine, 2-[4-((2-hydroxy-3-tridecyloxypropyl)-oxy)-2-hydroxyphenyl]-4,6-bis(2,4-dimethylphenyl)-1,3,5-triazine, and 2-(2,4-dihydroxyphenyl)-4,6-bis(2,4-dimethylphenyl)-1,3,5-triazine.

Specific examples of the salicylic acid derivative-based absorber include phenyl salicylate, p-octylphenyl salicylate, and 4-tert-butylphenyl salicylate.

Specific examples of the benzophenone-based absorber include 4-dihydroxybenzophenone, 2-hydroxy-4-methoxybenzophenone, 2,2'-dihydroxy-4-methoxybenzophenone, 2-hydroxy-4-methoxy-2'-carboxybenzophenone, 2-hydroxy-4-methoxy-5-sulfobenzophenone trihydrate, 2,2'-dihydroxy-4,4'-dimethoxybenzophenone, 2-hydroxy-4-octoxybenzophenone, 2-hydroxy-4-octadecyloxybenzophenone, sodium 2,2'-dihydroxy-4,4'-dimethoxy-5-sulfobenzophenone, 2,2',4,4'-tetrahydroxybenzophenone, 4-dodecyloxy-2-hydroxybenzophenone, 5-chloro-2-hydroxybenzophenone, resorcinol monobenzoate, 2,4-dibenzoylresorcinol, 4,6-dibenzoylresorcinol, hydroxydodecylbenzophenone, and 2,2'-dihydroxy-4(3-methacryloxy-2-hydroxypropoxy)benzophenone.

Examples of commercially available products of the ultraviolet absorber include "Tinuvin 900", "Tinuvin 928", "Tinuvin 384-2", "Tinuvin 479", "Tinuvin 405", and "Tinuvin 400" (available from BASF, trade name, Tinuvin is a registered trademark), and "RUVA 93" (available from Otsuka Chemical Co., Ltd., trade name).

Hindered Amine-Based Light Stabilizer (c22)

As the hindered amine-based light stabilizer (c22), hindered amine-based light stabilizers that have been known in the art, such as hindered piperidine compounds, can be used. In addition, the hindered amine-based light stabilizer (c22) may have a polymerizable unsaturated group.

Examples of the hindered amine-based light stabilizer (c22) include: hindered amine-based light stabilizers of monomer type, such as bis(1,2,2,6,6-pentamethyl-4-piperidyl) sebacate, bis(2,2,6,6-tetramethyl-4-piperidinyl) sebacate, bis(N-methyl-2,2,6,6-tetramethyl-4-piperidinyl) sebacate, 4-benzoyloxy-2,2',6,6'-tetramethylpiperidine, and bis(1,2,2,6,6-pentamethyl-4-piperidyl){[3,5-bis(1,1-dimethylethyl)-4-hydroxyphenyl]methyl}butyl malonate; hindered amine-based light stabilizers of oligomer type, such as poly{[6-(1,1,3,3-tetramethylbutypimino-1,3,5-triazin-2,4-diyl][(2,2,6,6-tetramethyl-4-piperidyl)imino]hexamethylene[(2,2,6,6-tetramethyl-4-piperidyl)iminol]}; hindered amine-based light stabilizers of polyester bond type, such as a polyesterified product of 4-hydroxy-2,2,6,6-tetramethyl-1-piperidine ethanol and succinic acid; and the hindered amine-based light stabilizers having a polymerizable unsaturated group, such as 1,2,2,6,6-pentamethyl-4-piperidyl methacrylate, and 2,2,6,6,-tetramethyl-4-piperidyl methacrylate.

Examples of commercially available products of the hindered amine-based light stabilizer include "Tinuvin 765", "Tinuvin 770DF", "Tinuvin 144", "Tinuvin 622SF", and "Tinuvin 152" (all available from BASF, trade names, Tinuvin is a registered trademark), and "ADK STAB LA-52", "ADK STAB LA-57", "ADK STAB LA-63P", "ADK STAB LA-72", "ADK STAB LA-77Y", "ADK STAB LA-81", "ADK STAB LA-82", and "ADK STAB LA-87" (all available from ADEKA CORPORATION, trade names, ADK STAB is a registered trademark).

Bonding of Hydroxyl Group-Containing Acrylic Resin (c1), Ultraviolet Absorber (c21), and Hindered Amine-Based Light Stabilizer (c22) with Silica Particles The dispersion of silica particles (C) can be obtained by forming a structure in which raw silica particles are bonded to the hydroxyl group-containing acrylic resin (c1) and the ultraviolet absorber (c21) and/or the hindered amine-based light stabilizer (c22). The aspect of the bonding between the raw silica particles and the hydroxyl group-containing acrylic resin (c1), the ultraviolet absorber (c21) and/or the hindered amine-based light stabilizer (c22) is not particularly limited as long as they are bonded by a covalent bond, and examples of the bonding may include bonding according to the following aspects (1), (2) and (3):

(1) an aspect in which the ultraviolet absorber (c21) and/or the hindered amine-based light stabilizer (c22) is bonded to the hydroxyl group-containing acrylic resin (c1), and this hydroxyl group-containing acrylic resin (c1) is bonded to the silica particles (an aspect in which the ultraviolet absorber (c21) and/or the hindered amine-based light stabilizer (c22) is bonded to the silica particles via the hydroxyl group-containing acrylic resin (c1));

(2) an aspect in which each of the ultraviolet absorber (c21) and/or the hindered amine-based light stabilizer (c22), and the hydroxyl group-containing acrylic resin (c1) is independently bonded to the silica particles; and (3) an aspect in which the above (1) and (2) are combined, the ultraviolet absorber (c21) and/or the hindered amine-based light stabilizer (c22) is bonded to the hydroxyl group-containing acrylic resin (c1), and this hydroxyl group-containing acrylic resin (c1) is bonded to the silica particles having the ultraviolet absorber (c21) and/or the hindered amine-based light stabilizer (c22) bonded thereto.

When the ultraviolet absorber (c21), the hindered amine-based light stabilizer (c22), and the hydroxyl group-containing acrylic resin (c1) are bonded to the silica particles, silica particles modified with a silane coupling agent or the like can be used as necessary.

Hereinafter, the above aspects (1) to (3) will be described.
Aspect (1): Aspect in which Hydroxyl Group-Containing Acrylic Resin (c1) Having Ultraviolet Absorber (c21) and/or Hindered Amine-Based Light Stabilizer (c22) Bonded Thereto is Bonded to Silica Particles The dispersion of silica particles (C) can be obtained as a dispersion of silica particles having an aspect in which the ultraviolet absorber (c21) and/or the hindered amine-based light stabilizer (c22) are bonded to the hydroxyl group-containing acrylic resin (c1), and the hydroxyl group-containing acrylic resin (c1) is bonded to the silica particles.

The dispersion of silica particles (C) of this aspect can be obtained, for example, by reacting silica particles (a) having a polymerizable unsaturated group with a polymerizable unsaturated monomer mixture (b) containing a hydroxyl group-containing polymerizable unsaturated monomer and a polymerizable unsaturated monomer having the ultraviolet absorber (c21) bonded thereto and/or a polymerizable unsaturated monomer having the hindered amine-based light stabilizer (c22) bonded thereto.

Silica Particles (a) Having Polymerizable Unsaturated Group

As the silica particles (a) having a polymerizable unsaturated group, for example, silica particles having a polymerizable unsaturated group, which can be obtained by mixing and heating raw silica particles, an organic solvent, and a monomer having a polymerizable unsaturated group and a hydrolyzable silyl group, can be used. In addition, silica particles obtained by further adding a tertiary amine to the silica particles (a) having a polymerizable unsaturated group can be used.

The organic solvent is preferably a hydrophilic organic solvent, and examples thereof include: alcohol-based organic solvents such as methanol, ethanol, isopropanol, n-butanol, and isobutanol; ether-based organic solvents such as dioxane and tetrahydrofuran; glycol ether-based organic solvents such as ethylene glycol monomethyl ether, ethylene glycol monoethyl ether, ethylene glycol mono-n-propyl ether, ethylene glycol monoisopropyl ether, ethylene glycol mono-n-butyl ether, ethylene glycol monoisobutyl ether, ethylene glycol mono-tert-butyl ether, diethylene glycol monomethyl ether, diethylene glycol monoethyl ether, diethylene glycol mono-n-propyl ether, diethylene glycol monoisopropyl ether, diethylene glycol mono-n-butyl ether, diethylene glycol monoisobutyl ether, diethylene glycol mono-tert-butyl ether, propylene glycol monomethyl ether, propylene glycol monoethyl ether, propylene glycol mono-n-propyl ether, propylene glycol monoisopropyl ether, dipropylene glycol monomethyl ether, dipropylene glycol monoethyl ether, dipropylene glycol mono-n-propyl ether, and dipropylene glycol monoisopropyl ether; and ester-based organic solvents such as ethyl acetate, butyl acetate, isobutyl acetate, and 3-methoxybutyl acetate. These can be used alone or in combination of two or more thereof.

As the organic solvent, alcohols and/or glycol ethers are preferable. Among them, alcohols having a boiling point of 64 to 132° C., particularly 82 to 118° C., and glycol ethers having a boiling point of 120 to 208° C., particularly 120 to 192° C. are more preferable, and alcohols having 2 to 8 carbon atoms, particularly 3 to 5 carbon atoms, and glycol ethers having 3 to 5 carbon atoms, particularly 3 to 4 carbon atoms are even more preferable.

Examples of the monomer having a polymerizable unsaturated group and a hydrolyzable silyl group include 3-(meth)acryloyloxypropyltrimethoxysilane, 3-(meth)acryloyloxypropyltriethoxysilane, 2-(meth)acryloyloxyethyltrimethoxysilane, 2-(meth)acryloyloxyethyltriethoxysilane, 3-(meth)acryloyloxypropylmethyldimethoxysilane, 2-(meth)acryloyloxyethylmethyldimethoxysilane, vinyltrimethoxysilane, vinyltriethoxysilane, allyltrimethoxysilane, allyltriethoxysilane, and a monomer having a polymerizable unsaturated group and a hydrolyzable silyl group obtained by reaction between a functional group other than a hydrolyzable silyl group of various silane coupling agents and a functional group other than an unsaturated group of an unsaturated compound.

The polymerizable unsaturated group-containing silica particles (a) are obtained by heating and mixing raw silica particles, an organic solvent, and a monomer having a polymerizable unsaturated group and a hydrolyzable silyl group. More specifically, raw silica particles dispersed in a dispersion medium, an organic solvent, and a monomer having a polymerizable unsaturated group and a hydrolyzable silyl group are mixed, the organic solvent and the dispersion medium for the silica particles (including a lower alcohol generated by hydrolysis of the monomer having a polymerizable unsaturated group and a hydrolyzable silyl group) are azeotropically distilled from the mixture under normal pressure or reduced pressure, and a dehydration condensation reaction is performed under heating while or after the dispersion medium is replaced with the organic solvent, whereby the polymerizable unsaturated group-containing silica particles can be produced.

A concentration of a non-volatile matter of the dispersion liquid during the reaction is preferably in a range of about 5 to about 50 mass %. When the concentration of the non-volatile matter is less than about 5 mass %, that is, when the solvent exceeds about 95 mass %, the time for the reaction between the silica particles and the monomer having a polymerizable unsaturated group and a hydrolyzable silyl group may be prolonged, leading to reduced production efficiency. On the other hand, when the concentration of the non-volatile matter exceeds about 50 mass %, the product may be gelled.

According to these production methods, a silicon atom on the surface of the raw silica particles and a silicon atom of the monomer having a polymerizable unsaturated group and a hydrolyzable silyl group are bonded via an oxygen atom to form a siloxane bond, whereby a dispersion liquid of the silica particles (a) having a polymerizable unsaturated group in which the silica particles and the monomer having a polymerizable unsaturated group and a hydrolyzable silyl group are chemically bonded can be obtained.

The compounding proportion of the monomer having a polymerizable unsaturated group and a hydrolyzable silyl group when obtaining the silica particles (a) having a polymerizable unsaturated group is preferably about 0.2 parts by mass to about 95 parts by mass, more preferably about 0.5 parts by mass to about 50 parts by mass, and still more preferably about 1.0 part by mass to about 20 parts by mass, with respect to 100 parts by mass of the silica particles. When the proportion of the monomer having a polymerizable unsaturated group and a hydrolyzable silyl group is less than about 0.2 parts by mass, the generated silica particles (a) having a polymerizable unsaturated group may have poor stability in the dispersion medium. When the proportion of the monomer having a polymerizable unsaturated group and a hydrolyzable silyl group is more than about 95 parts by mass, the monomer having a polymerizable unsaturated group and a hydrolyzable silyl group may remain unreacted in the reaction with the raw silica particles.

In a case of obtaining the silica particles (a) having a polymerizable unsaturated group, alkoxysilane having an alkyl group of one or more carbon atoms may be reacted with the raw silica particles together with the monomer having a polymerizable unsaturated group and a hydrolyzable silyl group, as necessary. The water resistance of the coating film to be formed may be improved by reacting an alkoxysilane having an alkyl group of one or more carbon atoms. Examples of the alkoxysilane having an alkyl group of one or more carbon atoms include methyltrimethoxysilane, ethyltrimethoxysilane, propyltrimethoxysilane, butyltrimethoxysilane, hexyltrimethoxysilane, decyltrimethoxysilane, and dodecyltrimethoxysilane, and compounds obtained by substituting the methoxy group in these exemplified compounds with an ethoxy group (for example, methyltriethoxysilane) are also exemplified.

As the dispersion liquid of the silica particles (a) having a polymerizable unsaturated group, a dispersion liquid of the polymerizable unsaturated group-containing silica particles (a) obtained by adding a tertiary amine may be also used, from the viewpoints of storage stability, scratch resistance, and the like.

The tertiary amine can be used without particular limitation as long as it is a tertiary amine having a molecular weight of 120 to 380, preferably 130 to 350, more preferably 150 to 300, and having an alkyl group and/or an aryl group at its molecular terminal. The tertiary amine is suitably a tertiary amine in which at least one of the alkyl groups has 3 or more carbon atoms, preferably 4 to 12, more preferably 5 to 10 carbon atoms, from the viewpoints of storage properties, scratch resistance, and the like. Among them, in particular, at least one of the alkyl groups included in the tertiary amine is preferably a linear alkyl group, from the viewpoints of storage properties, scratch resistance, and the like.

Examples of the tertiary amine include: linear tertiary amines such as tripropylamine, tributylamine, tri-n-pentylamine, tri-n-hexylamine, tri-n-heptylamine, and tri-n-octylamine; branched tertiary amines such as branched tritridecylamines such as triisopropylamine, triisobutylamine, and tri-2-ethylhexylamine; tertiary amines having a mixed hydrocarbon group such as dimethyloctylamine, dimethyldodecylamine, dimethyloctadecylamine, hexyldiethylamine, octyldiethylamine, and diethyldodecylamine; alicyclic tertiary amines such as dimethylcyclohexylamine and tricyclohexylamine; and tertiary amines having an aromatic ring substituent such as dimethylbenzylamine and tribenzylamine. These may be used alone or in combination of two or more thereof.

As a method for adding the tertiary amine to the dispersion liquid of the polymerizable unsaturated group-containing silica particles (a), a method that has been known in the art can be used. An amount of the tertiary amine used is suitably 0.1 to 5.0 parts by mass, preferably 1.5 to 3.0 parts by mass, and more preferably 1.7 to 2.5 parts by mass, based on 100 parts by mass of the solid content of the polymerizable unsaturated group-containing silica particles (a), from the viewpoints of storage stability, and scratch resistance and the like of a coating film to be obtained when compounded in a paint.

The silica particles (a) having a polymerizable unsaturated group obtained above are reacted with the polymerizable unsaturated monomer mixture (b) containing, as at least a part of its components, a hydroxyl group-containing polymerizable unsaturated monomer, and at least one type of polymerizable unsaturated monomer selected from a polymerizable unsaturated monomer having the ultraviolet absorber (c21) bonded thereto and a polymerizable unsaturated monomer having the hindered amine-based light stabilizer (c22) bonded thereto to obtain a dispersion of silica particles (C) having an aspect in which the hydroxyl group-containing acrylic resin (c1) having the ultraviolet absorber (c21) and/or the hindered amine-based light stabilizer (c22) bonded thereto is bonded to silica particles. Hereinafter, the polymerizable unsaturated monomer mixture (b) will be described.

Polymerizable Unsaturated Monomer Mixture (b)

The polymerizable unsaturated monomer mixture (b) to be reacted with the silica particles (a) having a polymerizable unsaturated group contains, as at least a part of its components, a hydroxyl group-containing polymerizable unsaturated monomer and at least one type of polymerizable unsaturated monomer selected from a polymerizable unsaturated monomer having the ultraviolet absorber (c21) bonded thereto and a polymerizable unsaturated monomer having the hindered amine-based light stabilizer (c22) bonded thereto.

As the hydroxyl group-containing polymerizable unsaturated monomer, the hydroxyl group-containing polymerizable unsaturated monomers described in relation to the hydroxyl group-containing acrylic resins (c1) can be used.

In addition, other polymerizable unsaturated monomers that are copolymerizable with the hydroxyl group-containing polymerizable unsaturated monomer may be added to the polymerizable unsaturated monomer mixture (b). Examples of such other polymerizable unsaturated monomers include the specific examples (1) to (8) of the compound having one or more polymerizable unsaturated groups per molecule described in relation to the hydroxyl group-containing acrylic resin (A1).

As the polymerizable unsaturated monomer having the ultraviolet absorber (c21) bonded thereto, an ultraviolet absorber having a polymerizable unsaturated group can be used, and as its commercially available product, for example, "RUVA-93" (trade name, available from Otsuka Chemical Co., Ltd.) can be suitably used.

The polymerizable unsaturated monomer having the ultraviolet absorber (c21) bonded thereto can be obtained, for example, by reacting a polymerizable unsaturated monomer having a reactive group with an ultraviolet absorber having a functional group that is reactive with the reactive group. Concretely, the polymerizable unsaturated monomer having the ultraviolet absorber (c21) bonded thereto can be obtained, for example, by reacting a polymerizable unsaturated monomer having an isocyanate group with an ultraviolet absorber having an active hydrogen group such as a hydroxyl group or an amino group, preferably a hydroxyl group.

As the polymerizable unsaturated monomer having the hindered amine-based light stabilizer (c22) bonded thereto, a hindered amine-based light stabilizer having a polymerizable unsaturated group can be used, and as its commercially available product, for example, "ADK STAB LA-82" and "ADK STAB LA-87" (available from ADEKA CORPORATION, trade name, ADK STAB is a registered trademark), and the like can be suitably used.

The polymerizable unsaturated monomer having the hindered amine-based light stabilizer (c22) bonded thereto can be obtained, for example, by reacting a polymerizable unsaturated monomer having a reactive group with a hindered amine-based light stabilizer having a functional group that is reactive with the reactive group. Specifically, the polymerizable unsaturated monomer having the hindered amine-based light stabilizer (c22) bonded thereto can be obtained, for example, by reacting a polymerizable unsaturated monomer having an isocyanate group with a hindered amine-based light stabilizer having an active hydrogen group such as a hydroxyl group or an amino group, preferably a hydroxyl group.

The proportion of the hydroxyl group-containing polymerizable unsaturated monomer in the polymerizable unsaturated monomer mixture (b) is preferably in a range of 4.5 to 37.5 mass %, more preferably in a range of 10 to 30, and still more preferably in a range of 15 to 20, with respect to the total amount of the polymerizable unsaturated monomer mixture (b).

The proportion of the polymerizable unsaturated monomer having the ultraviolet absorber (c21) bonded thereto in the polymerizable unsaturated monomer mixture (b) is preferably in a range of 0.5 to 40 mass %, more preferably in a range of 1 to 20 mass %, and still more preferably in a range of 1 to 15 mass % with respect to the total amount of the polymerizable unsaturated monomer mixture (b). The proportion of the polymerizable unsaturated monomer having the hindered amine-based light stabilizer (c22) bonded thereto in the polymerizable unsaturated monomer mixture (b) is preferably in a range of 1 to 30 mass %, more preferably in a range of 5 to 25 mass %, and still more preferably in a range of 10 to 20 mass % with respect to the total amount of the polymerizable unsaturated monomer mixture (b). Furthermore, the total proportion of the polymerizable unsaturated monomer having the ultraviolet absorber (c21) bonded thereto and the polymerizable unsaturated monomer having the hindered amine-based light stabilizer (c22) bonded thereto in the polymerizable unsaturated monomer mixture (b) is preferably in a range of 0.5 to 40 mass %, more preferably in a range of 10 to 40 mass %, and even more preferably in a range of 20 to 35 mass % with respect to the total amount of the polymerizable unsaturated monomer mixture (b).

The hydroxyl group-containing acrylic resin (c1) produced from the polymerizable unsaturated monomer mixture (b) has a hydroxyl value in a range of preferably 20 to 215 mg KOH/g, particularly 40 to 160 mg KOH/g, and more particularly 60 to 100 mg KOH/g, from the viewpoint of the scratch resistance of the coating film to be formed.

Formation of Dispersion of Silica Particles (C)

The dispersion of silica particles (C) can be obtained by subjecting the silica particles (a) having a polymerizable unsaturated group and the polymerizable unsaturated monomer mixture (b) to polymerization reaction in the presence of a solvent. The polymerization method is not particularly limited, and a polymerization method known per se can be used. Among them, a solution polymerization method in which polymerization is performed in an organic solvent in the presence of a catalyst, a polymerization initiator, and the like as appropriate can be suitably used.

Examples of the organic solvent used in the solution polymerization method include: aromatic compounds such as benzene, toluene, xylene, ethylbenzene, "Swasol 1000" and "Swasol 1500" (trade names, available from Maruzen Petrochemical Co., Ltd., high boiling point petroleum-based solvents); hydrocarbon-based solvents such as pentane, hexane, octane, cyclohexane, cycloheptane, and mineral spirit; halogenated hydrocarbons such as trichloroethylene and tetrachloroethylene; ester-based solvents such as ethyl acetate, n-butyl acetate, isobutyl acetate, ethyl propionate, methylcellosolve acetate, butylcarbitol acetate, ethylene glycol monomethyl ether acetate, diethylene glycol monobutyl ether acetate, and ethyl 3-ethoxypropionate; ketone-based solvents such as methyl ethyl ketone, methyl isobutyl ketone, diisobutyl ketone, and cyclohexanone; alcohol-based solvents such as methanol, ethanol, isopropanol, n-butanol, sec-butanol, isobutanol, ethylene glycol, ethylene glycol monomethyl ether, ethylene glycol monoethyl ether, and ethylene glycol monobutyl ether; ether-based solvents such as n-butyl ether, dioxane, dibutyl ether, and ethylene glycol dimethyl ether; and dimethylsulfoxide, dimethylformamide, N-methylpyrrolidone, or water. These organic solvents can be used alone or in combination of two or more. Among them, an aromatic solvent and an ester-based solvent are preferable, and an ester-based solvent is more preferable, from the viewpoint of appearance of the coating film to be formed.

Examples of the polymerization initiator that can be used in the polymerization include, but are not particularly limited to, radical polymerization initiators known per se, such as: peroxide-based polymerization initiators such as benzoyl peroxide, paramenthane hydroperoxide, cumene hydroperoxide, lauroyl peroxide, cyclohexanone peroxide, 3,3,5-trimethylcyclohexanone peroxide, methylcyclohexanone peroxide, tert-butyl peroxypivalate, 1,1'-bis(tert-butylperoxy)cyclohexane, 1,1-bis(tert-butylperoxy)-3,3,5-trimethylcyclohexane, n-butyl-4,4-bis(tert-butylperoxy)valerate, 2,2'-di(tert-butylperoxy)butane, tert-butylhydroxyperoxide, 2,5-dimethylhexane-2,5-dihydroperoxide, di-tert-butyl peroxide, di-n-propylperoxydicarbonate, tert-hexylperoxy-2-ethylhexanoate, 1,3-bis(tert-butylperoxy-m-isopropyl) benzene, 2,5-dimethyl-2,5-di(tert-butylperoxy)hexane, diisopropylbenzene peroxide, tert-butylcumylperoxide, decanoylperoxide, lauroylperoxide, benzoylperoxide, 2,4-dichlorobenzoylperoxide, bis(tert-butylcyclohexyl) peroxydicarbonate, tert-butyl peroxybenzoate, 2,5-dimethyl-2,5-di(benzoylperoxy)hexane, and hydrogen peroxide; azo-based polymerization initiators such as 1,1-azobis(cyclohexane-1-carbonitrile), azocumene, 2,2'-azobis-(2,4-dimethylvaleronitrile), 2,2'-azobis-(2-methylbutyronitrile), 2,2'-azobisisobutyronitrile, 2,2'-azobis-(4-methoxy-2,4-dimethylvaleronitrile, dimethyl 2,2'-azobis(2-methylpropionate), 2,2'-di(2-hydroxyethyl)azobisisobutylonitrile, 4,4'-azobis(4-cyanovaleric acid), 2-(tert-butylazo)-2-cyanopropane, 2,2'-azobis(2,4,4-trimethylpentane), 2,2'-azobis(2-methylpropane), dimethyl 2,2'-azobis(2-methylpropionate), and 2,2'-azobis-(N-butyl-2-methylpropionamide); persulfate-based initiators such as potassium persulfate and sodium persulfate; and redox initiators including a peroxide and a reducing agent.

An amount of the radical polymerization initiator used is preferably 0.1 to 20 parts by mass, particularly preferably 1 to 10 parts by mass with respect to 100 parts by mass of the polymerizable unsaturated monomer mixture (b). When the amount of the radical polymerization initiator is less than 0.1 parts by mass, a proportion of the unreacted polymerizable unsaturated monomer that does not react with the silica particles (a) having a polymerizable unsaturated group may increase. When the amount of the radical polymerization initiator is more than 20 parts by mass, silica particles having the hydroxyl group-containing acrylic resin (c1) bonded thereto may be polymerized with each other and cause aggregation of the particles.

The dispersion of silica particles (C) may contain an unreacted polymerizable unsaturated monomer or a polymer obtained by reaction between the polymerizable unsaturated monomers but not having reacted with the silica particles (a) having a polymerizable unsaturated group. The mixing ratio of the dispersion liquid of silica particles (a) having a polymerizable unsaturated group and the polymerizable unsaturated monomer mixture (b) is preferably in a range of (a):(b)=20:80 to 90:10, more preferably 30:70 to 80:20, and still more preferably 40:60 to 60:40 in terms of solid content mass ratio, from the viewpoint of appearance of the coating film to be formed.

In a case where the reaction between the silica particles (a) having a polymerizable unsaturated group and the polymerizable unsaturated monomer mixture (b) is carried out in a solvent, the total mass concentration of the silica particles (a) having a polymerizable unsaturated group and the polymerizable unsaturated monomer mixture (b) is preferably in a range of about 10 mass % to about 90 mass %, particularly in a range of about 20 mass % to about 70 mass %. When the total mass concentration is less than about 10 mass %, the reaction time may be prolonged, leading to reduced production efficiency. When the total mass concentration is higher than about 90 mass %, the viscosity of the reaction system becomes high, making stirring difficult.

From the viewpoint of suppressing inhibition of the polymerization reaction by oxygen to improve the reaction rate, it is preferable to carry out the reaction under stirring while replacing a gas phase in a reaction vessel with an inert gas. The reaction temperature and the reaction time can be appropriately selected depending on the type and the like of the polymerizable unsaturated monomer mixture (b), but the reaction temperature is preferably in a range of about 0° C. to about 250° C., and the reaction time is preferably in a range of 1 to 72 hours. The reaction can usually be carried out under normal pressure, but can also be carried out under increased pressure or reduced pressure.

The polymerization rate of the polymerizable unsaturated monomer mixture (b) in the above reaction is preferably about 90% or more, particularly preferably about 95% or more. With the polymerization rate of the polymerizable unsaturated monomer mixture (b) being less than about 90%, the coating film performance such as scratch resistance may be inferior, and when the obtained dispersion of silica particles (C) is used, an odor resulting from an unreacted polymerizable unsaturated monomer mixture (b) may be problematic. An amount of the unreacted polymerizable unsaturated monomer mixture (b) can be reduced by extending the reaction time. In a case where the amount of the unreacted polymerizable unsaturated monomer mixture (b) is small, it can be reduced by carrying out further polymerization reaction by adding a radical polymerization initiator. Furthermore, the solvent of the obtained dispersion of silica particles (C) may be replaced with another solvent such as water, as desired.

The glass transition temperature Tg of the hydroxyl group-containing acrylic resin bonded to the dispersion of silica particles (C) obtained by the production method is preferably in a range of −40 to 40° C., and more preferably in a range of −30 to 30° C., from the viewpoint of scratch resistance of the coating film to be formed.

Aspect (2): Aspect in which Each of Ultraviolet Absorber (c21) and/or Hindered Amine-Based Light Stabilizer (c22), and Hydroxyl Group-Containing Acrylic Resin (c1) is Independently Bonded to Silica Particles The dispersion of silica particles (C) can also be obtained as a dispersion of silica particles having an aspect in which each of the ultraviolet absorber (c21) and/or the hindered amine-based light stabilizer (c22), and the hydroxyl group-containing acrylic resin (c1) is independently bonded to the silica particles.

The dispersion of silica particles (C) in this aspect can be obtained, for example, by reacting silica particles (a') having the ultraviolet absorber (c21) and/or the hindered amine-based light stabilizer (c22) bonded thereto and having a polymerizable unsaturated group with a polymerizable unsaturated monomer mixture (d) containing a hydroxyl group-containing polymerizable unsaturated monomer.

Silica Particles (a') Having Ultraviolet Absorber (c21) and/or Hindered Amine-Based Light Stabilizer (c22) Bonded Thereto and Having Polymerizable Unsaturated Group The silica particles (a') having the ultraviolet absorber (c21) and/or the hindered amine-based light stabilizer (c22) bonded thereto and having a polymerizable unsaturated group can be obtained, for example, by reacting a compound having an ultraviolet absorbing group and/or a hindered amine-based light stabilizing group and a hydrolyzable silyl group and a monomer having a polymerizable unsaturated group and a hydrolyzable silyl group with raw silica particles.

The compound having an ultraviolet absorbing group and/or a hindered amine-based light stabilizing group and a hydrolyzable silyl group can be obtained, for example, by reacting a silane coupling agent having a reactive group with an ultraviolet absorber and/or a hindered amine-based light stabilizer having a functional group that is reactive with the reactive group. For example, a compound having an ultraviolet absorbing group and/or a hindered amine-based light stabilizing group and a hydrolyzable silyl group can be obtained by reacting a silane-coupling agent having an isocyanate group with the ultraviolet absorber (c21) or the hindered amine-based light stabilizer (c22) having an active hydrogen group such as a hydroxy group or an amino group.

Examples of the silane coupling agent to be suitably used include 3-(trimethoxysilyl)propyl isocyanate and 3-(triethoxysilyl)propyl isocyanate. Examples of commercially available products thereof include "SILIQUEST A-Link 25" and "SILIQUEST A-Link 35" (available from Momentive Performance Materials Inc., trade name, SILIQUEST is a trademark. Silane coupling agent having an isocyanate group), and "KBE-9007N" (available from Shin-Etsu Silicone Co., Ltd., trade name, 3-(triethoxysilyl)propyl isocyanate).

Examples of the ultraviolet absorber (c21) or the hindered amine-based light stabilizer (c22) include the ultraviolet absorber (c21) or the hindered amine-based light stabilizer (c22) having a hydroxy group. Examples of commercially available products thereof include "Tinuvin PS", "Tinuvin 99-2", "Tinuvin 326", "Tinuvin 384-2", "Tinuvin 900", "Tinuvin 928", "Tinuvin 1130", "Tinuvin 400", "Tinuvin 405", "Tinuvin 460", "Tinuvin 477", "Tinuvin 479", "UVA-903KT", and "UVA-935LH" (all available from BASF, trade name, Tinuvin is a registered trademark. Ultraviolet absorbers having a hydroxy group), "Tinuvin 111 FDL", "Tinuvin 144", and "Tinuvin 152" (the same as above. Hindered amine-based light stabilizers having a hydroxy group).

As such a compound having an ultraviolet absorbing group and/or a hindered amine-based light stabilizing group and a hydrolyzable silyl group, its commercially available product may be used. Examples of such commercially available products include "TMPS-E" (available from Shin-Etsu Silicone Co., Ltd., hindered amine-based light stabilizing group-containing silane).

The compound having an ultraviolet absorbing group and/or a hindered amine-based light stabilizing group and a hydrolyzable silyl group described above and the monomer having a polymerizable unsaturated group and a hydrolyzable silyl group are reacted with raw silica particles, and thus the silica particles (a') having the ultraviolet absorber (c21) and/or the hindered amine-based light stabilizer (c22) bonded thereto and having a polymerizable unsaturated group can be obtained.

As the monomer having a polymerizable unsaturated group and a hydrolyzable silyl group to be used for obtaining the silica particles (a'), the same monomer as the monomer having a polymerizable unsaturated group and a hydrolyzable silyl group to be used for obtaining the silica (a) can be used.

The method of reacting the compound having an ultraviolet absorbing group and/or a hindered amine-based light stabilizing group and a hydrolyzable silyl group and the monomer having a polymerizable unsaturated group and a hydrolyzable silyl group with the raw silica particles is not particularly limited, and a commonly used treatment method using a silane coupling agent can be appropriately selected. Examples of the method include a method of adding a solution containing a compound having an ultraviolet absorbing group and/or a hindered amine-based light stabilizing group and a hydrolyzable silyl group to a slurry containing raw silica particles and stirring the mixture.

Polymerizable Unsaturated Monomer Mixture (d)

The silica particles (a') obtained as described above is reacted with a polymerizable unsaturated monomer mixture (d) containing a hydroxyl group-containing polymerizable unsaturated monomer as at least a part of the components thereof, and thus the dispersion of silica particles (C) can be obtained.

As the hydroxyl group-containing polymerizable unsaturated monomer contained in the polymerizable unsaturated monomer mixture (d), the same hydroxyl group-containing polymerizable unsaturated monomer as that used in the polymerizable unsaturated monomer mixture (b) can be used. To the polymerizable unsaturated monomer mixture (d), other polymerizable unsaturated monomers that are copolymerizable with the hydroxyl group-containing polymerizable unsaturated monomer may be added as in the polymerizable unsaturated monomer mixture (b).

A proportion of the hydroxyl group-containing polymerizable unsaturated monomer in the polymerizable unsaturated monomer mixture (d) is preferably in a range of 4.5 to 37.5 mass %, more preferably in a range of 10 to 30, and still more preferably in a range of 15 to 20, with respect to the total amount of the polymerizable unsaturated monomer mixture (d).

The hydroxyl group-containing acrylic resin (c1) produced from the polymerizable unsaturated monomer mixture (d) has a hydroxyl value in a range of preferably 20 to 215 mg KOH/g, particularly 40 to 160 mg KOH/g, and more particularly 60 to 100 mg KOH/g, from the viewpoint of scratch resistance of the coating film to be formed.

Formation of Dispersion of Silica Particles (C)

The dispersion of silica particles (C) can be obtained by subjecting the silica particles (a') having the ultraviolet absorber (c21) and/or the hindered amine-based light stabilizer (c22) bonded thereto and having a polymerizable unsaturated group and the polymerizable unsaturated monomer mixture (d) to polymerization reaction under the presence of a solvent. The polymerization method is not particularly limited, and for example, a polymerization method based on a polymerization reaction between the silica particles (a) having a polymerizable unsaturated group and the polymerizable unsaturated monomer mixture (b) can be used.

The mass ratio of the silica particles (a') having the ultraviolet absorber (c21) and/or the hindered amine-based light stabilizer (c22) bonded thereto and having a polymerizable unsaturated group to the polymerizable unsaturated monomer mixture (d) is preferably in a range of 20/80 to 90/10, more preferably in a range of 40/60 to 65/35, and still more preferably in a range of 45/55 to 55/45, in terms of the ratio (a')/(d).

The glass transition temperature Tg of the hydroxyl group-containing acrylic resin bonded to the dispersion of silica particles (C) obtained by the production method is preferably in a range of −40 to 40° C., and more preferably in a range of −30 to 30° C., from the viewpoint of scratch resistance of the coating film to be formed.

Aspect (3): Aspect in which Aspect (1) and Aspect (2) Described Above are Combined An aspect of bonding between the raw silica particles and the hydroxyl group-containing acrylic resin (c1), the ultraviolet absorber (c21) and/or the hindered amine-based light stabilizer (c22) may be a combined aspect of the above aspects (1) and (2), in which the ultraviolet absorber (c21) and/or the hindered amine-based light stabilizer (c22) is bonded to the hydroxyl group-containing acrylic resin (c1), and this hydroxyl group-containing acrylic resin (c1) is bonded to the silica particles having the ultraviolet absorber (c21) and/or the hindered amine-based light stabilizer (c22) bonded thereto.

The dispersion of silica particles (C) of this aspect can be obtained, for example, by reacting the "silica particles (a') having the ultraviolet absorber (c21) and/or the hindered amine-based light stabilizer (c22) bonded thereto and having a polymerizable unsaturated group" described in aspect (2) with the "polymerizable unsaturated monomer mixture (b) containing a hydroxyl group-containing polymerizable unsaturated monomer and a polymerizable unsaturated monomer having the ultraviolet absorber (c21) bonded thereto and/or a polymerizable unsaturated monomer having the hindered amine-based light stabilizer (c22) bonded thereto" described in aspect (1). Each component, reaction conditions, and the like can be selected in accordance with the details described in the above aspects (1) and (2).

Coating Composition

The coating composition of the present invention can be obtained by mixing the hydroxyl group-containing resin (A) obtained as described above, the crosslinking agent (B), and the dispersion of silica particles (C) having the hydroxyl group-containing acrylic resin (c1) bonded thereto and having the ultraviolet absorber (c21) and/or the hindered amine-based light stabilizer (c22) bonded thereto.

The content of the dispersion of silica particles (C) having the hydroxyl group-containing acrylic resin (c1) bonded thereto and having the ultraviolet absorber (c21) and/or the hindered amine-based light stabilizer (c22) bonded thereto in the coating composition of the present invention is in a range of suitably 0.1 to 25 mass %, preferably 0.5 to 20 mass %, and more preferably 1 to 10 mass %, based on the total solid content of the hydroxyl group-containing resin (A) and the crosslinking agent (B), from the viewpoints of scratch resistance, transparency, water resistance, finished appearance, and the like of the coating film to be formed.

Furthermore, the coating composition of the present invention may contain, as necessary, a color pigment, an effect pigment, a dye, and the like, and may further contain, as appropriate, an extender pigment, an ultraviolet absorber, a light stabilizer, a catalyst, a defoaming agent, a thickener, a rust inhibitor, a surface conditioner, an organic solvent, and the like.

Examples of the color pigment include titanium oxide, zinc oxide, carbon black, cadmium red, molybdenum red, chrome yellow, chromium oxide, Prussian blue, cobalt blue, azo pigments, phthalocyanine pigments, quinacridone pigments, isoindoline pigments, threne-based pigments, and perylene pigments.

Examples of the effect pigment include aluminum pigments, mica pigments, mica pigments coated with titanium oxide, and aluminum oxide pigments coated with titanium oxide.

Examples of the extender pigment include talc, clay, kaolin, baryta, barium sulfate, barium carbonate, calcium carbonate, and alumina white.

The above pigments can be used alone or in combination of two or more types.

In a case where the coating composition of the present invention is used as a clear paint and contains a pigment, a compounding amount of the pigment is preferably an amount to the extent that does not inhibit transparency of the resulting coating film. For example, the amount is preferably in a range of typically 0.1 to 20 mass %, particularly 0.3 to 10 mass %, and more particularly 0.5 to 5 mass %, with respect to the total solid content in the coating composition.

In a case where the coating composition of the present invention is used as a colored paint and contains a pigment, a compounding amount of the pigment is preferably in a range of typically 1 to 200 mass %, particularly 2 to 100 mass %, and more particularly 5 to 50 mass %, with respect to the total solid content in the coating composition.

In the present specification, the "solid content" means a nonvolatile component such as a resin, a crosslinking agent, or a pigment contained in the coating composition, which remains after the coating composition is dried at 110° C. for 1 hour. Thus, for example, the total solid content of the coating composition can be calculated by weighing the coating composition in a heat-resistant container such as an aluminum foil cup, spreading the coating composition on the bottom of the container, then drying the coating composition at 110° C. for 1 hour, weighing the mass of components in the coating composition remaining after drying, and determining a ratio of the mass of the components remaining after drying to the total mass of the coating composition before drying.

For the ultraviolet absorber, an ultraviolet absorber that has been known in the art can be used, and examples thereof include a benzotriazole-based absorber, a triazine-based absorber, a salicylic acid derivative-based absorber, and a benzophenone-based absorber. These can be used alone or in combination of two or more types.

In a case where the coating composition of the present invention contains the ultraviolet absorber, a compounding amount of the ultraviolet absorber is preferably in a range of typically 0.1 to 10 mass %, particularly of 0.2 to 5 mass %, and more particularly of 0.3 to 2 mass % with respect to the total solid content in the coating composition.

As the light stabilizer, a light stabilizer that has been known in the art can be used, and examples thereof include a hindered amine-based light stabilizer.

As the hindered amine-based light stabilizer, from the viewpoint of pot life, a hindered amine-based light stabilizer having low basicity can be suitably used. Examples of the hindered amine-based light stabilizer include acylated hindered amine and amino ether-based hindered amine, and specific examples thereof include "HOSTAVIN 3058" (trade name, available from Clariant AG) and "Tinuvin 123" (trade name, available form BASF).

When the coating composition of the present invention contains the light stabilizer, a compounding amount of the light stabilizer is preferably in a range of typically 0.1 to 10 mass %, particularly 0.2 to 5 mass %, and more particularly 0.3 to 2 mass %, with respect to the total solid content of the coating composition.

As the catalyst, catalysts that have been known in the art can be used, and for example, in a case where the coating composition of the present invention contains the polyisocyanate compound and/or the blocked polyisocyanate compound as the crosslinking agent (B), the coating composition of the present invention can contain a urethanization reaction catalyst.

Specific examples of the urethanization reaction catalyst include: organometallic compounds such as tin octylate, dibutyltin diacetate, dibutyltin di(2-ethylhexanoate), dibutyltin dilaurate, dioctyltin diacetate, dioctyltin di(2-ethylhexanoate), dibutyltin oxide, dibutyltin sulfide, dioctyltin oxide, dibutyltin fatty acid salts, lead 2-ethylhexanoate, zinc octylate, zinc naphthenate, zinc fatty acids, bismuth octanoate, bismuth 2-ethylhexanoate, bismuth oleate, bismuth neodecanoate, bismuth versatate, bismuth naphthenate, cobalt naphthenate, calcium octylate, copper naphthenate, and tetra(2-ethylhexyl) titanate; and tertiary amines. These can be used alone or in combination of two or more types.

In a case where the coating composition of the present invention contains the urethanization reaction catalyst, a compounding amount of the urethanization reaction catalyst is preferably in a range of 0.005 to 2 mass %, and particularly 0.01 to 1 mass %, with respect to the total solid content of the coating composition of the present invention.

In a case where the coating composition of the present invention contains the urethanization reaction catalyst, from the viewpoints of storage stability, curability, and the like, the coating composition of the present invention may contain: an organic acid such as acetic acid, propionic acid, butyric acid, isopentanoic acid, hexanoic acid, 2-ethylbutyric acid, naphthenic acid, octylic acid, nonanoic acid, decanoic acid, 2-ethylhexanoic acid, isooctanoic acid, isononanoic acid, lauric acid, palmitic acid, stearic acid, oleic acid, linoleic acid, neodecanoic acid, versatic acid, isobutyric anhydride, itaconic anhydride, acetic anhydride, citraconic anhydride, propionic anhydride, maleic anhydride, butyric anhydride, citric anhydride, trimellitic anhydride, pyromellitic anhydride, or phthalic anhydride; an inorganic acid such as hydrochloric acid or phosphoric acid; a metal coordinating compound such as acetylacetone or an imidazole-based compound; or the like.

In a case where the coating composition of the present invention uses the melamine resin as the crosslinking agent (B), the coating composition of the present invention may contain, as a curing catalyst, a sulfonic acid such as para-toluenesulfonic acid, dodecylbenzenesulfonic acid, or dinonylnaphthalenesulfonic acid; an ester of an alkylphosphoric acid such as monobutylphosphoric acid, dibutylphosphoric acid, mono(2-ethylhexyl)phosphoric acid, or di(2-ethylhexyl)phosphoric acid; a salt of such an acid with an amine compound; or the like.

In a case where the coating composition of the present invention contains the curing catalyst for the melamine resin, a compounding amount of the curing catalyst for the melamine resin is in a range of preferably 0.1 to 2 mass %, particularly 0.2 to 1.7 mass %, and more particularly 0.3 to 1.4 mass %, with respect to the total solid content of the coating composition of the present invention.

In a preferred aspect, the coating composition of the present invention is an organic solvent-type coating composition in which the solvent is a solvent mainly including an organic solvent.

Examples of the organic solvent include aromatic solvents such as toluene, xylene, and "Swasol 1000" (available from Cosmo Oil Co., Ltd., trade name, high boiling point petroleum-based solvent); ester-based solvents such as ethyl acetate, butyl acetate, propyl propionate, butyl propionate, 1-methoxy-2-propyl acetate, 2-ethoxyethyl propionate, ethyl-3-ethoxypropionate, 3-methoxybutyl acetate, ethylene glycol monoethyl ether acetate, diethylene glycol monoethyl ether acetate, and propylene glycol monomethyl ether acetate; ketone-based solvents such as methyl ethyl ketone, methyl isobutyl ketone, and methyl amyl ketone; alcohol-based solvents such as isopropanol, n-butanol, isobutanol, and 2-ethylhexanol; and the like. These can be used alone or in combination of two or more types.

Coating Method

Examples of the object to be coated for application of the coating composition of the present invention include, but are not particularly limited to, outer panel parts of automobile bodies, such as those of passenger cars, trucks, motorcycles, and buses; automobile parts; outer panel parts of home electrical appliances, such as mobile phones and audio devices. Among them, outer panel parts of automobile bodies and automobile parts are preferable.

Examples of base materials of the object to be coated include, but are not particularly limited to, metal materials, such as iron, aluminum, brass, copper, tin plates, stainless steel, galvanized steel, and zinc alloy (such as Zn—Al, Zn—Ni, and Zn—Fe)-plated steel; resins, such as polyethylene resins, polypropylene resins, acrylonitrile-butadiene-styrene (ABS) resins, polyamide resins, acrylic resins, vinylidene chloride resins, polycarbonate resins, polyurethane resins, and epoxy resins; plastic materials, such as various FRPs; inorganic materials, such as glass, cement, and concrete; woods; and fiber materials (such as paper and cloth). Among them, the metal materials and the plastic materials are suitable.

The object to be coated may be one subjected to surface treatment, such as phosphate treatment, chromate treatment, or composite oxide treatment, on the metal materials or metal surfaces of an automobile body or the like formed from the metal materials. Further, the object to be coated may be one in which an undercoat film of various electrodeposition paints or the like is formed on the metal base material, vehicle body, or the like, or one in which an intermediate coat film is formed on the undercoat film. In addition, the object to be coated may be one in which a primer coating film is formed on a plastic base material such as a bumper. The intermediate coat film and the primer coating film may be uncured.

The coating method of the coating composition of the present invention is not particularly limited, and examples thereof include coating methods such as air spraying, airless spraying, rotary atomization coating, and curtain coating. By these methods, a wet coating film can be formed. In these coating methods, an electrostatic voltage may be applied as necessary. Among these, air spraying, airless spraying, and rotary atomization coating are particularly preferred. An applied amount of the coating composition of the present invention is typically an amount resulting in a cured film thickness of preferably 10 to 60 µm and particularly 25 to 50 µm.

In a case where air spraying, airless spraying, and rotary atomization coating are carried out, it is preferable to appropriately adjust a viscosity of the coating composition of the present invention using a solvent such as an organic solvent to be in a viscosity range suitable for the coating, typically in a viscosity range of 15 to 60 seconds, particularly 20 to 40 seconds, at 20° C. in a Ford Cup No. 4 viscometer.

The wet coating film formed by applying the coating composition of the present invention to the object to be coated can be cured by heating, and the heating can be carried out by known heating means. For example, a drying furnace such as a hot air furnace, an electric furnace, or an infrared induction heating furnace can be used. The heating temperature is not particularly limited, but is preferably in a range of 60 to 160° C. and more preferably in a range of to 140° C. The heating time is not particularly limited, but is preferably in a range of 10 to 60 minutes and more preferably in a range of 15 to 30 minutes.

The coating composition of the present invention is a coating composition capable of forming a coating film excelling in scratch resistance, particularly a coating composition capable of forming a coating film that can maintain excellent scratch resistance for a long period of time even in an outdoor environment, and can be thus particularly suitably used as a topcoating top clearcoat material. The coating composition of the present invention can be suitably particularly used as a paint for automobiles.

Note that although the reason why a coating film capable of maintaining excellent scratch resistance for a long period of time even in an outdoor environment can be obtained by the present paint is not clear, it is presumed that a hydroxyl group in the hydroxyl group-containing resin (A) and a hydroxyl group in the hydroxyl group-containing acrylic resin (c1) bonded to the silica particles (C) are reacted with the crosslinking agent (B) to form a coating film in which the silica particles (C) are firmly bonded in a crosslinked coating film formed of the hydroxyl group-containing resin (A) and the crosslinking agent (B), and a relatively large amount of silica particles (C) move toward the surface side of the coating film in the drying process of the coating film, so that a relatively large amount of silica particles (C) are present on the surface side of the coating film, whereby a relatively large amount of ultraviolet absorber (c21) and/or hindered amine-based light stabilizer (c22) bonded to the silica particles (C) are present on the surface side of the coating film. Consequently, ultraviolet absorbing function and/or light stabilizing function on the surface side of the coating film is enhanced, and the ultraviolet absorber (c21) and/or the hindered amine-based light stabilizer (c22) bonded to the silica particles (C) is firmly bonded to the crosslinked coating film formed of the hydroxyl group-containing resin (A) and the crosslinking agent (B), thereby suppressing outflow to the outside of the coating film due to rain or the like, and effectively suppressing degradation of the coating film for a long period of time.

Method of Forming Multilayer Coating Film

Examples of the method of forming a multilayer coating film in which the coating composition of the present invention is applied as a topcoating top clearcoat paint include a method of forming a multilayer coating film by sequentially applying at least one layer of a colored basecoat paint and at least one layer of a clearcoat paint to an object to be coated, the method including applying the coating composition of the present invention as the clearcoat paint for the uppermost layer.

Specific examples of the method of forming a multilayer coating film include: a 2-coat-1-bake method in which an undercoat film is formed using an electrodeposition paint, the undercoat film is cured, then an intermediate coat film is formed on the undercoat film using an intermediate coat paint, the intermediate coat film is cured, then a colored basecoat paint is applied on the intermediate coat film, preheating is performed at, for example, 40 to 90° C. for 3 to 30 minutes to promote volatilization of a solvent in the colored basecoat paint as necessary without curing the colored basecoat film, the coating composition of the present invention is applied as a clearcoat paint on the uncured colored basecoat film, and then the colored basecoat film and the clearcoat film are cured together; and a 3-coat-1-bake method in which an undercoat film is formed using an electrodeposition paint, the undercoat film is cured, an intermediate coat film is then formed on the undercoat film using an intermediate coat paint, preheating is performed at, for example, 40 to 90° C. for 3 to 30 minutes to promote volatilization of a solvent in the intermediate coat paint as necessary without curing the intermediate coat film, a colored basecoat paint is applied on the uncured intermediate coat film, preheating is performed at, for example, 40 to 90° C. for 3 to 30 minutes to promote volatilization of a solvent in the colored basecoat paint as necessary without curing the colored basecoat film, the coating composition of the present invention is applied as a clearcoat paint on the uncured colored basecoat film, and then the intermediate coat film, the colored basecoat film, and the clearcoat film are cured together.

As the intermediate coat paint used in the above, an ordinary thermosetting intermediate coat paint that has been known in the art can be used, and specifically, for example, a paint obtained by appropriately combining, in a base resin such as an acrylic resin, a polyester resin, an alkyd resin, or a urethane resin, a crosslinking agent, such as an amino resin, a polyisocyanate compound, or a blocked polyisocyanate compound, with a reactive functional group contained in the base resin can be used. The reactive functional group contained in the base resin is preferably a hydroxyl group.

As the intermediate coat paint, for example, a water-based paint, an organic solvent-based paint, or a powder paint can be used. Among them, a water-based paint is preferable from the viewpoints of environmental load reduction, and finished appearance and the like of the coating film.

As the basecoat paint used above, an ordinary thermosetting basecoat paint that has been known in the art can be used, and specifically, for example, a paint obtained by appropriately combining, in a base resin such as an acrylic resin, a polyester resin, an alkyd resin, or a urethane resin, a crosslinking agent, such as an amino resin, a polyisocyanate compound, or a blocked polyisocyanate compound, with a reactive functional group contained in the base resin can be used. The reactive functional group contained in the base resin is preferably a hydroxyl group.

As the basecoat paint, for example, a water-based paint, an organic solvent-based paint, or a powder paint can be used. Among them, a water-based paint is preferable from the viewpoints of environmental load reduction, and finished appearance and the like of the coating film.

In the method of forming a multilayer coating film, in a case where two or more layers of clearcoat are applied, as a clearcoat paint for a layer other than the uppermost layer, the coating composition of the present invention may be used or a thermosetting clearcoat paint that has been known in the art may be used.

EXAMPLES

The present invention will be described more specifically below through production examples, examples, and comparative examples. However, the present invention is not limited by these examples. In each example, "parts" and "%" are based on mass unless otherwise specified. In addition, the film thickness of the coating film is based on a cured coating film.

Production of Hydroxyl Group-Containing Resin (A)

Production Example 1

To a reaction vessel equipped with a thermometer, a thermostat, a stirrer, a reflux condenser, a nitrogen-introducing tube, and a dropping device, 27 parts of "Swasol 1000" (trade name, available from COSMO OIL Co., Ltd., aromatic organic solvent) and 5 parts of propylene glycol monomethyl ether acetate were charged, the mixture was stirred at 150° C. while nitrogen gas was purged, and a monomer mixture including 20 parts of styrene, 32.5 parts of 2-hydroxypropyl acrylate, 46.5 parts of isobutyl methacrylate, 1.0 part of acrylic acid, and 1.5 parts of di-tert-amyl peroxide (polymerization initiator) was added dropwise thereto at a uniform rate over 4 hours. Thereafter, the mixture was aged at 150° C. for 1 hour, then cooled, and further diluted with 34 parts of butyl acetate, and a hydroxyl group-containing acrylic resin (A1-1) solution having a solid content concentration of 60 mass % was obtained. The obtained hydroxyl group-containing acrylic resin (A1-1) had a hydroxyl value of 140 mg KOH/g, an acid value of 8.0 mg KOH/g, a weight average molecular weight of 10000, and a glass transition temperature of 39° C. The hydroxyl group-containing acrylic resin (A1-1) is a secondary hydroxyl group-containing acrylic resin (A1').

Production Example 2

To a reaction vessel equipped with a thermometer, a thermostat, a stirrer, a reflux condenser, a nitrogen-introducing tube, and a dropping device, 30 parts of "Swasol 1000" (trade name, available from COSMO OIL Co., Ltd., aromatic organic solvent) and 10 parts of n-butanol were charged. While nitrogen gas was purged into the reaction vessel, the charged solution was stirred at 125° C., and a monomer mixture including 30 parts of γ-methacryloxypropyltrimethoxysilane, 32.5 parts of 2-hydroxypropyl acrylate, 20 parts of styrene, 17.5 parts of isobutyl methacrylate, and 7.0 parts of 2,2'-azobis(2-methylbutyronitrile) (polymerization initiator) was added dropwise thereto at a uniform rate over 4 hours. After the mixture was aged at 125° C. for 30 minutes, a solution including 0.5 parts of 2,2'-azobis(2-methylbutyronitrile) and 5.0 parts of "Swasol 1000" (trade name, available from COSMO OIL Co., Ltd., aromatic organic solvent) was added dropwise thereto at a uniform rate over 1 hour. Thereafter, the mixture was aged at 125° C. for 1 hour, then cooled, and further diluted with 8 parts of isobutyl acetate, and a hydroxyl group-containing acrylic resin (A1-2) solution having a solid content concentration of 65 mass % was obtained. The obtained hydroxyl group-containing acrylic resin (A1-2) had an alkoxysilyl group content of 1.21 mmol/g, a hydroxyl value of 140 mg KOH/g, a weight average molecular weight of 7000, and a glass transition temperature of 18° C. The hydroxyl group-containing acrylic resin (A1-2) is an acrylic resin (A1''') having a secondary hydroxyl group and an alkoxysilyl group.

Production Example 3

To a reaction vessel equipped with a thermometer, a thermostat, a stirrer, a reflux condenser, a nitrogen-introducing tube, and a dropping device, 30 parts of "Swasol 1000" (trade name, available from COSMO OIL Co., Ltd., aromatic organic solvent) and 10 parts of n-butanol were charged. While nitrogen gas was purged into the reaction vessel, the charged solution was stirred at 125° C., and a monomer mixture including 30 parts of γ-methacryloxypropyltrimethoxysilane, 32.5 parts of 2-hydroxyethyl methacrylate, 15 parts of styrene, 10 parts of n-butyl acrylate, 5 parts of 2-ethylhexyl acrylate, 6.5 parts of methyl methacrylate, 1 part of methacrylic acid, and 4.5 parts of 2,2'-azobis(2-methylbutyronitrile) (polymerization initiator) was added dropwise thereto at a uniform rate over 4 hours. After the mixture was aged at 125° C. for 30 minutes, a solution including 0.5 parts of 2,2'-azobis(2-methylbutyronitrile) and 5.0 parts of "Swasol 1000" (trade name, available from COSMO OIL Co., Ltd., aromatic organic solvent) was added dropwise thereto at a uniform rate over 1 hour. Thereafter, the mixture was aged at 125° C. for 1 hour, then cooled, and further diluted with 8 parts of isobutyl acetate, and a hydroxyl group-containing acrylic resin (A1-3) solution having a solid content concentration of 65 mass % was obtained. The obtained hydroxyl group-containing acrylic resin (A1-3) had an alkoxysilyl group content of 1.21 mmol/g, a hydroxyl value of 140 mg KOH/g, an acid value of 6.7 mg KOH/g, a weight average molecular weight of 10000, and a glass transition temperature of 20° C. The hydroxyl group-containing acrylic resin (A1-3) is an acrylic resin (A1'') having a hydroxyl group and an alkoxysilyl group.

Production Example 4

To a reaction vessel equipped with a thermometer, a thermostat, a stirrer, a reflux condenser, a nitrogen-introducing tube, and a dropping device, 27 parts of "Swasol 1000" (trade name, available from COSMO OIL Co., Ltd., aromatic organic solvent) and 5 parts of propylene glycol monomethyl ether acetate were charged, the mixture was stirred at 150° C. while nitrogen gas was purged, and a monomer mixture including 20 parts of styrene, 32.5 parts of 2-hydroxyethyl methacrylate, 46.5 parts of isobutyl methacrylate, 1.0 part of acrylic acid, and 1.5 parts of di-tert-amyl peroxide (polymerization initiator) was added dropwise thereto at a uniform rate over 4 hours. Thereafter, the mixture was aged at 150° C. for 1 hour, then cooled, and further diluted with 34 parts of butyl acetate, and a hydroxyl group-containing acrylic resin (A1-4) solution having a solid content concentration of 60 mass % was obtained. The obtained hydroxyl group-containing acrylic resin (A1-4) had a hydroxyl value of 140 mg KOH/g, an acid value of 8.0 mg KOH/g, a weight average molecular weight of 10000, and a glass transition temperature of 62.6° C. The hydroxyl group-containing acrylic resin (A1-4) is a hydroxyl group-containing acrylic resin (A1).

Production of Compound Having Ultraviolet Absorbing Group and Hydrolyzable Silyl Group Production Example 5

To a separable flask equipped with a thermometer, a stirrer, a reflux condenser, and a nitrogen-introducing tube, 70 parts of "SILIQUEST A-Link 25 Silane" (trade name, available from Momentive Performance Materials, 3-isocyanatepropyltriethoxysilane, solid content 100%), 137.7 parts of "Tinuvin 405" (trade name, available from BASF, hydroxyl group-containing ultraviolet absorber, solid content 100%), and 207.7 parts of butyl acetate were charged, and mixed and stirred at room temperature. Thereafter, the reaction was performed at 80° C. for 3 hours using a mantle heater, and a compound (s-1) having an ultraviolet absorbing group and a hydrolyzable silyl group and having a solid content concentration of 50 mass % was obtained.

Production Example 6

To a separable flask equipped with a thermometer, a stirrer, a reflux condenser, and a nitrogen-introducing tube, 70 parts of "SILIQUEST A-Link 35 Silane" (trade name, available from Momentive Performance Materials, 3-isocyanatepropyltrimethoxysilane, solid content 100%), 165.9 parts of "Tinuvin 405" (trade name, available from BASF, hydroxyl group-containing ultraviolet absorber, solid content 100%), and 235.9 parts of butyl acetate were charged, and mixed and stirred at room temperature. Thereafter, the reaction was performed at 80° C. for 3 hours using a mantle heater, and a compound (s-2) having an ultraviolet absorbing group and a hydrolyzable silyl group and having a solid content concentration of 50 mass % was obtained.

Production of Compound Having Hindered Amine-Based Photostabilizing Group and Hydrolyzable Silyl Group Production Example 7

To a separable flask equipped with a thermometer, a stirrer, a reflux condenser, and a nitrogen-introducing tube, 70 parts of "SILIQUEST A-Link 25 Silane" (trade name, available from Momentive Performance Materials, 3-isocyanatepropyltriethoxysilane, solid content 100%), 203.4 parts of "Tinuvin 152" (trade name, available from BASF, hindered amine-based light stabilizer having a hydroxyl group, solid content 100%), and 273.4 g of butyl acetate were charged, and mixed and stirred at room temperature. Thereafter, the reaction was performed at for 3 hours using a mantle heater, and a compound (s-3) having a hindered amine-based photostabilizing group and a hydrolyzable silyl group and having a solid content concentration of mass % was obtained.

Production Example 8

To a separable flask equipped with a thermometer, a stirrer, a reflux condenser, and a nitrogen-introducing tube, 70 parts of "SILIQUEST A-Link 35 Silane" (trade name, available from Momentive Performance Materials, 3-isocyanatepropyltrimethoxysilane, solid content 100%), 245.1 parts of "Tinuvin 152" (trade name, available from BASF, hindered amine-based light stabilizer having a hydroxyl group, solid content 100%), and 315.1 g of butyl acetate were charged, and mixed and stirred at room temperature. Thereafter, the reaction was performed at for 3 hours using a mantle heater, and a compound (s-4) having a hindered amine-based photostabilizing group and a hydrolyzable silyl group and having a solid content concentration of mass % was obtained.

Production of Silica Particles (a) Having Polymerizable Unsaturated Group

Production Example 9

To a separable flask equipped with a reflux condenser, a thermometer, and a stirrer, 333 parts (solid content 100 parts) of "PGM-ST" (trade name, available from Nissan Chemical Industries, Ltd., average primary particle size of silica: 15 nm, silica concentration: 30 mass %, dispersion medium: propylene glycol monomethyl ether) and 10 parts of deionized water were charged, then 10 parts (solid content 10 parts) of "KBM-503" (trade name, available from Shin-Etsu Chemical Co., Ltd., γ-methacryloyloxypropyltrimethoxysilane) were added thereto, and the mixture was subjected to dehydration condensation reaction under stirring at 80° C. for 3 hours. Thereafter, 0.03 parts of tetra-n-butylammonium fluoride was added thereto, and the mixture was further reacted under stirring for one hour. After completion of the reaction, 30 parts of propylene glycol monomethyl ether was added, volatile components were distilled off under reduced pressure, and a polymerizable unsaturated group-containing silica particle dispersion liquid (a-1) having a solid content of 40% was obtained.

Production Example 10

To a separable flask equipped with a reflux condenser, a thermometer, and a stirrer, 250 parts (solid content 100 parts) of "SNOWTEX O-40" (trade name, available from Nissan Chemical Industries, Ltd., average primary particle size of silica: 20 to 25 nm, silica concentration: 40 mass %, dispersion medium: water) and 250 parts of propylene glycol monomethyl ether were charged. Then, 10 parts (solid content 10 parts) of "KBM-503" (trade name, available from Shin-Etsu Chemical Co., Ltd., γ-methacryloyloxypropyltrimethoxysilane) was added thereto, and the mixture was subjected to dehydration condensation reaction under stirring at 80° C. for 3 hours. Thereafter, 0.03 parts of tetra-n-butylammonium fluoride was added thereto, and the mixture was further reacted under stirring for one hour. After completion of the reaction, 200 parts of propylene glycol monomethyl ether was added thereto, then volatile components were distilled off under reduced pressure, and a polymerizable unsaturated group-containing silica particle dispersion liquid (a-2) having a solid content of 40% was obtained.

Production of Silica Particles (a') Having Ultraviolet Absorber (c21) and/or Hindered Amine-Based Light Stabilizer (c22) Bonded Thereto and Having Polymerizable Unsaturated Group Production Example 11

To a separable flask equipped with a reflux condenser, a thermometer, and a stirrer, 333 parts (solid content 100 parts) of "PGM-ST" (trade name, available from Nissan Chemical Industries, Ltd., average primary particle size of silica: 15 nm, silica concentration: 30 mass %, dispersion medium: propylene glycol monomethyl ether) and 10 parts of deionized water were charged, then 10 parts (solid content 10 parts) of "KBM-503" (trade name, available from Shin-Etsu Chemical Co., Ltd., γ-methacryloyloxypropyltrimethoxysilane) and 20 parts (solid content parts) of the compound (s-1) having an ultraviolet absorbing group and a hydrolyzable silyl group obtained in Production Example 5 were then added thereto, and the mixture was subjected to dehydration condensation reaction under stirring at 80° C. for 3 hours. Thereafter, parts of tetra-n-butylammonium fluoride was added thereto, and the mixture was further reacted under stirring for one hour. After completion of the reaction, 30 parts of propylene glycol monomethyl ether was added thereto, then volatile components were distilled off under reduced pressure, and a silica particle dispersion liquid (a'-1) having a solid content of 40% in which the silica particles have the ultraviolet absorber (c21) bonded thereto and a polymerizable unsaturated group was obtained.

Production Examples 12 to 15

Silica particle dispersion liquids (a'-2) to (a'-5) having a solid content of 40% in which the silica particles have the ultraviolet absorber (c21) and/or the hindered amine-based light stabilizer (c22) bonded thereto and having a polymerizable unsaturated group were obtained in the same manner as in Production Example 11 except that formulations shown in Table 1 were used.

TABLE 1

| Production Example | | 11 | 12 | 13 | 14 | 15 |
|---|---|---|---|---|---|---|
| Name of dispersion liquid of silica particles (a') having polymerizable unsaturated group | | a'-1 | a'-2 | a'-3 | a'-4 | a'-5 |
| Raw silica particles | "PGM-ST" | 333 | 333 | 333 | 333 | 333 |
| | Deionized water | 10 | 10 | 10 | 10 | 10 |
| Alkoxysilane having polymerizable unsaturated group | "KBM-503" | 10 | 10 | 10 | 10 | 10 |
| Compound having ultraviolet absorbing group and hydrolyzable silyl group | Compound (s-1) having ultraviolet absorbing group and hydrolyzable silyl group | 20 | | | 20 | |
| | Compound (s-2) having ultraviolet absorbing group and hydrolyzable silyl group | | | | | 20 |
| Compound having hindered amine-based photostabilizing group and hydrolyzable silyl group | Compound (s-3) having hindered amine-based photostabilizing group and hydrolyzable silyl group | | 20 | | 20 | |
| | Compound (s-4) having hindered amine-based photostabilizing group and hydrolyzable silyl group | | | | | 20.2 |
| | "TMPS-E" (Note 1) | | | 10 | | |

(Note 1)
"TMPS-E": trade name, available from Shin-Etsu Chemical Co., Ltd., compound having a hindered amine-based photostabilizing group and a hydrolyzable silyl group, active ingredient 95% or more.

Production Example 16

To a separable flask equipped with a reflux condenser, a thermometer, and a stirrer, 250 parts (solid content 100 parts) of "SNOWTEX O-40" (trade name, available from Nissan Chemical Industries, Ltd., average primary particle size of silica: 20 to 25 nm, silica concentration: 40 mass %, dispersion medium: water) and 250 parts of propylene glycol monomethyl ether were charged, 10 parts (solid content 10 parts) of "KBM-503" (trade name, available from Shin-Etsu Chemical Co., Ltd., γ-methacryloyloxypropyltrimethoxysilane) and 20 parts (solid content 10 parts) of the compound (s-1) having an ultraviolet absorbing group and a hydrolyzable silyl group obtained in Production Example 5, and 20 parts (solid content 10 parts) of the compound (s-3) having a hindered amine-based light stabilizer and a hydrolyzable silyl group obtained in Production Example 7 were then added thereto, and the mixture was subjected to dehydration condensation reaction under stirring at 80° C. for 3 hours. Thereafter, parts of tetra-n-butylammonium fluoride was added thereto, and the mixture was further reacted under stirring for one hour. After completion of the reaction, 200 parts of propylene glycol monomethyl ether was added thereto, then volatile components were distilled off under reduced pressure, and a silica particle dispersion liquid (a'-6) having a solid content of 40% in which the silica particles have the ultraviolet absorber (c21) and the hindered amine-based light stabilizer (c22) bonded thereto and having a polymerizable unsaturated group was obtained.

Production of Dispersion of Silica Particles (C) Having Hydroxyl Group-Containing Acrylic Resin (c1) Bonded Thereto and Having Ultraviolet Absorber (c21) and/or Hindered Amine-Based Light Stabilizer (c22) Bonded Thereto Production Example 17

To a separable flask equipped with a reflux condenser, a thermometer, a stirrer, and a nitrogen gas inlet, 135 parts of propylene glycol monomethyl ether was charged, and the temperature was raised to 100° C. under nitrogen gas purging. After reaching 100° C., a mixture of 250 parts (solid content 100 parts) of a dispersion liquid of silica particles (a-1) having a polymerizable unsaturated group obtained in Production Example 9, 5 parts of 4-hydroxybutyl acrylate, 13 parts of 2-hydroxypropyl acrylate, 10 parts (solid content 10 parts) of "RUVA-93" (trade name, available from Otsuka Chemical Co., Ltd., polymerizable unsaturated monomer having ultraviolet absorber (c21) bonded thereto), 25 parts of styrene, 5 parts of isobornyl acrylate, 41 parts of 2-ethylhexyl acrylate, 1 part of acrylic acid, and 2.5 parts (solid content 2.5 parts) of "V-59" (trade name, available from Fujifilm Wako Pure Chemical Industries, Ltd., 2,2'-azobis(2-methylbutyronitrile)) was added dropwise over 2 hours. Then, after aging at 100° C. for 1 hour, a mixed solution of 0.83 parts of "V-59" and 20 parts of propylene glycol monomethyl ether was added dropwise over 0.5 hours, followed by aging for further 2 hours. The polymerization rate determined from the nonvolatile content was 99%. Thereafter, ethoxyethyl propionate was added thereto, the solvent was replaced by azeotropic distillation under reduced pressure, and a dispersion (C-1) of silica particles having a measured non-volatile content of 40% was obtained.

Production Examples 18 to 47

Silica particle dispersions (C-2) to (C-31) were obtained in the same manner as in Production Example 17 except that the formulations shown in Tables 2 to 6 were used. Among them, the silica particle dispersion (C-30) does not have the ultraviolet absorber (c21) and the hindered amine-based light stabilizer (c22) bonded thereto, and thus does not correspond to the dispersion of silica particles (C) having the hydroxyl group-containing acrylic resin (c1) bonded thereto and the ultraviolet absorber (c21) and/or the hindered amine-based light stabilizer (c22) bonded thereto. In addition, the dispersion of silica particles (C-31) does not have the hydroxyl group-containing acrylic resin (c1) bonded thereto, and thus does not correspond to the dispersion of silica particles (C).

TABLE 2

| Production Example | | | 17 | 18 | 19 | 20 | 21 | 22 |
|---|---|---|---|---|---|---|---|---|
| Name of dispersion of silica particles (C) | | | C-1 | C-2 | C-3 | C-4 | C-5 | C-6 |
| Dispersion liquid of silica particles (a) having polymerizable unsaturated group | | Silica particle dispersion liquid (a-1) | 250 | 250 | 250 | 250 | | 250 |
| | | Silica particle dispersion liquid (a-2) | | | | | 250 | |
| Polymerizable unsaturated monomer mixture (b) | Hydroxyl group-containing polymerizable unsaturated monomer | 4-hydroxybutyl acrylate | 5 | 5 | 5 | 5 | 5 | 5 |
| | | 2-hydroxypropyl acrylate | 13 | 13 | 13 | 13 | 13 | 13 |
| | Polymerizable unsaturated monomer having ultraviolet absorber (c21) bonded thereto | "RUVA-93" | 10 | | 10 | 10 | 10 | 10 |
| | Polymerizable unsaturated monomer having hindered amine-based light stabilizer (c22) bonded thereto | "ADK STAB LA82" (Note 2) | | 15 | 15 | | 15 | 15 |
| | | "ADK STAB LA87" (Note 3) | | | | 10 | | |
| | Other polymerizable unsaturated monomers | Styrene | 25 | 25 | 25 | 25 | 25 | 20 |
| | | Isobornyl acrylate | 5 | 5 | 5 | 5 | 5 | |
| | | 2-ethylhexyl acrylate | 41 | 36 | 26 | 31 | 26 | 37 |
| | | Acrylic acid | 1 | 1 | 1 | 1 | 1 | |
| | | "X-22-174ASX" (Note 4) | | | | | | |
| | | n-butyl methacrylate | | | | | | |
| | | n-butyl acrylate | | | | | | |
| | | Methyl methacrylate | | | | | | |
| Hydroxyl value of hydroxyl group-containing acrylic resin (c1) [mg KOH/g] | | | 78 | 78 | 78 | 78 | 78 | 78 |

TABLE 3

| Production Example | | | 23 | 24 | 25 | 26 | 27 | 28 |
|---|---|---|---|---|---|---|---|---|
| Name of dispersion of silica particles (C) | | | C-7 | C-8 | C-9 | C-10 | C-11 | C-12 |
| Dispersion liquid of silica particles (a) having polymerizable unsaturated group | | Silica particle dispersion liquid (a-1) | 250 | 250 | 250 | 250 | 300 | 200 |
| | | Silica particle dispersion liquid (a-2) | | | | | | |
| Polymerizable unsaturated monomer mixture (b) | Hydroxyl group-containing polymerizable unsaturated monomer | 4-hydroxybutyl acrylate | 5 | 20 | | 5 | 5 | 5 |
| | | 2-hydroxypropyl acrylate | 13 | | 20 | 13 | 13 | 13 |
| | Polymerizable unsaturated monomer having ultraviolet absorber (c21) bonded thereto | "RUVA-93" | 10 | 10 | 10 | 15 | 10 | 10 |
| | Polymerizable unsaturated monomer having hindered amine-based light stabilizer (c22) bonded thereto | "ADK STAB LA82" (Note 2) | 15 | 15 | 15 | 10 | 15 | 15 |
| | | "ADK STAB LA87" (Note 3) | | | | | | |
| | Other polymerizable unsaturated monomers | Styrene | 25 | 25 | 25 | | 25 | 25 |
| | | Isobornyl acrylate | 5 | 5 | 5 | | 5 | 5 |
| | | 2-ethylhexyl acrylate | 25.5 | 24 | 24 | | 26 | 26 |
| | | Acrylic acid | 1 | 1 | 1 | | 1 | 1 |
| | | "X-22-174ASX" (Note 4) | 0.5 | | | | | |
| | | n-butyl methacrylate | | | | 56 | | |
| | | n-butyl acrylate | | | | 1 | | |
| | | Methyl methacrylate | | | | | | |
| Hydroxyl value of hydroxyl group-containing acrylic resin (c1) [mg KOH/g] | | | 78 | 86 | 86 | 78 | 78 | 78 |

TABLE 4

| Production Example | | | | 29 | 30 | 31 | 32 | 33 | 34 |
|---|---|---|---|---|---|---|---|---|---|
| | Name of dispersion of silica particles (C) | | | C-13 | C-14 | C-15 | C-16 | C-17 | C-18 |
| Dispersion liquid of silica particles (a) having a polymerizable unsaturated group | Dispersion liquid of silica particles (a') having ultraviolet absorber (c21) nd/or hindered amine-based light stabilizer (c22) bonded thereto and having polymerizable unsaturated group | Dispersion liquid of silica particles having ultraviolet absorber (c21) bonded thereto and having polymerizable unsaturated group | Silica particle dispersion liquid (a'-1) | 250 | | | | | |
| | | Dispersion liquid of silica particles having hindered amine-based light stabilizer (c22) bonded thereto and having polymerizable unsaturated group | Silica particle dispersion liquid (a'-2) | | 250 | | | | |
| | | | Silica particle dispersion liquid (a'-3) | | | 250 | | | |
| | | Dispersion liquid of silica particles having ultraviolet absorber (c21) and hindered amine-based light stabilizer (c22) bonded thereto and having polymerizable unsaturated group | Silica particle dispersion liquid (a'-4) | | | | 250 | | |
| | | | Silica particle dispersion liquid (a'-5) | | | | | 250 | |
| | | | Silica particle dispersion liquid (a'-6) | | | | | | 250 |
| Polymerizable unsaturated monomer mixture (d) | Hydroxyl group-containing polymerizable unsaturated monomer | | 4-hydroxybutyl acrylate | 5 | 5 | 5 | 5 | 5 | 5 |
| | | | 2-hydroxypropyl acrylate | 13 | 13 | 13 | 13 | 13 | 13 |
| | Other polymerizable unsaturated monomers | | Styrene | 25 | 25 | 25 | 25 | 25 | 25 |
| | | | Isobornyl acrylate | 5 | 5 | 5 | 5 | 5 | 5 |
| | | | 2-ethylhexyl acrylate | 51 | 51 | 51 | 51 | 51 | 51 |
| | | | Acrylic acid | 1 | 1 | 1 | 1 | 1 | 1 |
| Hydroxyl value of hydroxyl group-containing acrylic resin (c1) [mg KOH/g] | | | | 78 | 78 | 78 | 78 | 78 | 78 |

TABLE 5

| Production Example | | | | 35 | 36 | 37 | 38 | 39 | 40 | 41 |
|---|---|---|---|---|---|---|---|---|---|---|
| | Name of dispersion of silica particles (C) | | | C-19 | C-20 | C-21 | C-22 | C-23 | C-24 | C-25 |
| Dispersion liquid of silica particles (a) having polymerizable unsaturated group | Dispersion liquid of silica particles (a') having ultraviolet absorber (c21) and/or hindered amine-based light stabilizer (c22) bonded thereto and having polymerizable unsaturated group | Dispersion liquid of silica particles having ultraviolet absorber (c21) and hindered amine-based light stabilizer (c22) bonded thereto and having polymerizable unsaturated group | Silica particle dispersion liquid (a'-4) | 250 | 250 | 250 | 250 | 250 | 250 | 250 |

TABLE 5-continued

| | | Production Example | 35 | 36 | 37 | 38 | 39 | 40 | 41 |
|---|---|---|---|---|---|---|---|---|---|
| Polymerizable unsaturated monomer mixture (b) | Hydroxyl group-containing polymerizable unsaturated monomer | 4-hydroxybutyl acrylate | 5 | 5 | 20 | | 15 | 5 | 5 |
| | | 2-hydroxypropyl acrylate | 13 | 13 | | 20 | 18 | 13 | 13 |
| | Polymerizable unsaturated monomer having ultraviolet absorber (c21) bonded thereto | "RUVA-93" | | | | | | 10 | |
| | Polymerizable unsaturated monomer having hindered amine-based light stabilizer (c22) bonded thereto | "ADK STAB LA82" (Note 2) | | | | | | | 15 |
| | | "ADK STAB LA87" (Note 3) | | | | | | | |
| | Other polymerizable unsaturated monomers | Styrene | 20 | 25 | 25 | 25 | | 25 | 25 |
| | | Isobornyl acrylate | 15 | 5 | 5 | 5 | | 5 | 5 |
| | | 2-ethylhexyl acrylate | 37 | 40.5 | 39 | 39 | | 41 | 36 |
| | | Acrylic acid | | 1 | 1 | 1 | | 1 | 1 |
| | | "X-22-174ASX" (Note 4) | | 0.5 | | | | | |
| | | n-butyl methacrylate | | | | | 56 | | |
| | | n-butyl acrylate | | | | | 1 | | |
| | | Methyl methacrylate | 10 | 10 | 10 | 10 | 10 | | |
| Hydroxyl value of hydroxyl group-containing acrylic resin (c1) [mg KOH/g] | | | 78 | 78 | 86 | 86 | 142 | 78 | 78 |

TABLE 6

| | | | | 42 | 43 | 44 | 45 | 46 | 47 |
|---|---|---|---|---|---|---|---|---|---|
| | Production Example | | | | | | | | |
| | Name of dispersion of silica particles (C) | | | C-26 | C-27 | C-28 | C-29 | C-30 | C-31 |
| Dispersion liquid of silica particles (a) having polymerizable unsaturated group | Dispersion liquid of silica particles (a') having ultraviolet absorber (c21) and/or hindered amine-based light stabilizer (c22) bonded thereto and having polymerizable unsaturated group | Dispersion liquid of silica particles having ultraviolet absorber (c21) bonded thereto and having polymerizable unsaturated group | Silica particle dispersion liquid (a'-1) | | 250 | | | | |
| | | Dispersion liquid of silica particles having hindered amine-based light stabilizer (c22) bonded thereto and having polymerizable unsaturated group | Silica particle dispersion liquid (a'-2) | | | | 250 | | |
| | | | Silica particle dispersion liquid (a'-3) | | | | | 250 | |
| | | Dispersion liquid of silica particles having ultraviolet absorber (c21) and hindered amine-based light stabilizer (c22) bonded thereto and having polymerizable unsaturated group | Silica particle dispersion liquid (a'-4) | 250 | | | | | |
| | | | Silica particle dispersion liquid (a-1) | | | | | 250 | 250 |
| | | | Silica particle dispersion liquid (a-2) | | | | | | |
| Polymerizable unsaturated monomer mixture (b) | Hydroxyl group-containing polymerizable unsaturated monomer | | 4-hydroxybutyl acrylate | 5 | 5 | 5 | 5 | 5 | 0 |
| | | | 2-hydroxypropyl acrylate | 13 | 13 | 13 | 13 | 13 | 0 |
| | Polymerizable unsaturated monomer having ultraviolet absorber (c21) bonded thereto | | "RUVA-93" | 10 | 10 | 10 | 10 | | 10 |

TABLE 6-continued

| Production Example | | 42 | 43 | 44 | 45 | 46 | 47 |
|---|---|---|---|---|---|---|---|
| Polymerizable unsaturated monomer having hindered amine-based light stabilizer (c22) bonded thereto | "ADK STAB LA82" (Note 2) | 15 | 15 | 15 | 15 | | 15 |
| | "ADK STAB LA87" (Note 3) | | | | | | |
| Other polymerizable unsaturated monomers | Styrene | 25 | 25 | 25 | 25 | 25 | 30 |
| | Isobornyl acrylate | 5 | 5 | 5 | 5 | 5 | 5 |
| | 2-ethylhexyl acrylate | 26 | 26 | 26 | 26 | 51 | 39 |
| | Acrylic acid | 1 | 1 | 1 | 1 | 1 | 1 |
| | "X-22-174ASX" (Note 4) | | | | | | |
| | n-butyl methacrylate | | | | | | |
| | n-butyl acrylate | | | | | | |
| | Methyl methacrylate | | | | | | |
| Hydroxyl value of hydroxyl group-containing acrylic resin (c1) [mg KOH/g] | | 78 | 78 | 78 | 78 | 78 | 0 |

(Note 2)
"ADK STAB LA-82": trade name, available from ADEKA CORPORATION, a polymerizable unsaturated monomer having the hindered amine-based light stabilizer (c22) bonded thereto.
(Note 3)
"ADK STAB LA-87": trade name, available from ADEKA CORPORATION, a polymerizable unsaturated monomer having the hindered amine-based light stabilizer (c22) bonded thereto.
(Note 4)
"X-22-174ASX": trade name, available from Shin-Etsu Chemical Co., Ltd., a polysiloxane chain-containing polymerizable unsaturated monomer.

Production of Coating Compositions

Example 1

112.6 parts (solid content 67.6 parts) of the hydroxyl group-containing acrylic resin (A1-1) solution obtained in Production Example 1, 32.4 parts (solid content 32.4 parts) of "Sumidur N3300" (trade name, available from Sumitomo Covestro Urethane Co., Ltd., isocyanurate ring adduct of hexamethylene diisocyanate, solid content 100%), 7.5 parts (solid content 3 parts) of the silica particle dispersion (C-1) obtained in Production Example 17, 1 part (solid content 0.25 parts) of "NACURE 4167" (trade name, available from KING INDUSTRIES, Ltd., triethyl amine salt of alkylphosphoric acid, active ingredient 25%), and 0.38 parts (solid content 0.2 parts) of "BYK-300" (trade name, available from BYK Chemie GMBH, surface conditioner, active ingredient 52%) were uniformly mixed, butyl acetate was further added thereto to adjust the viscosity at 20° C. in Ford Cup No. 4 to 30 seconds, and a coating composition No. 1 was obtained.

Examples 2 to 38 and Comparative Examples 1 to 5

Coating compositions No. 2 to No. 43 were obtained in the same manner as in Example 1 except that formulations of the components were changed to the formulations shown in the following Tables 7 to 13.

Evaluation of Coating Compositions
Preparation of Object to be Coated for Testing "Elecron GT-10" (trade name, available from Kansai Paint Co., Ltd., cationic electrodeposition paint) was electrodeposition coated onto a cold-rolled steel sheet that was chemically treated with zinc phosphate such that the dry film thickness was 20 μm, and cured by heating at 170° C. for 30 minutes, and then "WP-306T" (trade name, available from Kansai Paint Co., Ltd., polyester-melamine resin-based aqueous intermediate coat paint) was electrostatically coated onto the cured film using a rotary atomizing type electrostatic coating apparatus such that the cured film thickness was 30 μm, the obtained product was left standing for 5 minutes, preheated at 80° C. for 3 minutes, then heated at 140° C. for 30 minutes, and an intermediate coat film was obtained and served as an object to be coated for testing.

Preparation of Test Sheet

"WBC-713T No. 202" (trade name, available from Kansai Paint Co., Ltd., acryl melamine resin-based aqueous basecoat paint, black color) was electrostatically coated onto the object to be coated for testing using a rotary atomizing type electrostatic coating apparatus such that the cured film thickness was 15 μm, and the obtained product was then left standing for 5 minutes and then preheated at 80° C. for 3 minutes.

Next, the coating composition No. 1 obtained in Example 1 was electrostatically coated onto the uncured basecoat film using the rotary atomizing type electrostatic coating apparatus such that the dry film thickness was 40 μm to form a clearcoat film, and the obtained product was left standing for 7 minutes. Then, heating was performed at 140° C. for 30 minutes to thermally cure the basecoat film and the clearcoat film, thereby preparing a test sheet of Example 1.

Production of Test Sheets of Examples 2 to 38 and Comparative Examples 1 to 5

Test sheets of Examples 2 to 38 and Comparative Examples 1 to 5 were prepared in the same manner as in the preparation of the test sheet of the coating composition No. 1 except that the coating composition No. 1 in the preparation of the test sheet of the coating composition No. 1 was changed to the corresponding one of the coating compositions Nos. 2 to 43.

The test sheets obtained above were evaluated through the following test method. Evaluation results are collectively shown in Tables 7 to 13 together with paint compositions.

Test Method

Scratch resistance in car wash after outdoor exposure: 20° gloss values of the test sheets obtained above were measured using a gloss meter "Micro Tri Gross" (available from BYK-Gardner GMBH). Each test sheet was then exposed outdoors in Okinoerabujima in Kagoshima Prefecture for 12 months. Thereafter, each test sheet after outdoor exposure was fixed to a test bench of a car washing tester "Car-wash Lab Apparatus" (available from Amtec Kistler GMBH) under an atmosphere of 20° C. A car washing brush was rotated at 127 rpm and the test bench was moved back and forth 10 times while a test liquid obtained by mixing 1.5 g of "Sikron SH200" (trade name, available from Quarzwerke GMBH, silica particles having a particle size of 24 µm) with 1 litre of water is sprayed on the test sheet. Thereafter, washing with water and drying were performed, and the 20° gloss value after the test was measured using a gloss meter "Micro Tri Gross" (available from Byk-Gardner GMBH), and the gloss retention rate was calculated from the following equation and evaluated according to the following criteria. A higher gloss retention rate indicates a better scratch resistance in car wash after outdoor exposure. When the evaluation result is A or B, it is acceptable.

Gloss retention rate (%)=(20° gloss value after test/ 20° gloss value before test)×100

A: Gloss retention rate is 50% or more
B: Gloss retention rate is 45% or more and less than 50%
C: Gloss retention rate is 40% or more and less than 45%
D: Gloss retention rate is less than 40%.

TABLE 7

| | | | | Examples | | | | | |
|---|---|---|---|---|---|---|---|---|---|
| | | | | 1 | 2 | 3 | 4 | 5 | 6 |
| | | Name of coating composition | | No. 1 | No. 2 | No. 3 | No. 4 | No. 5 | No. 6 |
| Hydroxyl group-containing resin (A) | Hydroxyl group-containing acrylic resin (A1) | Secondary hydroxyl group-containing acrylic resin (A1') | Hydroxyl group-containing acrylic resin (A1-1) solution | 112.6 | 112.6 | 112.6 | 112.6 | 112.6 | 112.6 |
| | | Acrylic resin (A1''') having secondary hydroxyl group and alkoxysilyl group | Hydroxyl group-containing acrylic resin (A1-2) solution | | | | | | |
| | | Acrylic resin (A1'') having primary hydroxyl group and alkoxysilyl group | Hydroxyl group-containing acrylic resin (A1-3) solution | | | | | | |
| | | Primary hydroxyl group-containing acrylic resin (A1) | Hydroxyl group-containing acrylic resin (A1-4) solution | | | | | | |
| Crosslinking agent (B) | | Polyisocyanate compound | "Sumidur N3300" | 32.4 | 32.4 | 32.4 | 32.4 | 32.4 | 32.4 |
| | | Melamine resin | "CYMEL 202" (Note 5) | | | | | | |
| Dispersion of silica particles (C) | | | Product name | C-1 | C-2 | C-3 | C-4 | C-5 | C-6 |
| | | | Compounding amount | 7.5 | 7.5 | 7.5 | 7.5 | 7.5 | 7.5 |
| Catalyst | | | "Nacure 4167" | 1.0 | 1.0 | 1.0 | 1.0 | 1.0 | 1.0 |
| Ultraviolet absorber | Ultraviolet absorber having hydroxyl group | | "Tinuvin 405" | | | | | | |
| Hindered amine-based light stabilizer | Hindered amine-based light stabilizer having hydroxyl group | | "Tinuvin 152" | | | | | | |
| | Hindered amine-based light stabilizer having no hydroxyl group | | "Tinuvin 123" (Note 6) | | | | | | |
| Surface conditioner | | | "BYK-300" "BYK-333" (Note 7) | 0.38 | 0.38 | 0.38 | 0.38 | 0.38 | 0.38 |
| Evaluation | Scratch resistance in car wash after outdoor exposure | | | A | B | A | A | A | A |

TABLE 8

| | | | | Examples | | | | | |
|---|---|---|---|---|---|---|---|---|---|
| | | | | 7 | 8 | 9 | 10 | 11 | 12 |
| | | Name of coating composition | | No. 7 | No. 8 | No. 9 | No. 10 | No. 11 | No. 12 |
| Hydroxyl group-containing resin (A) | Hydroxyl group-containing acrylic resin (A1) | Secondary hydroxyl group-containing acrylic resin (A1') | Hydroxyl group-containing acrylic resin (A1-1) solution | 112.6 | 112.6 | 112.6 | 112.6 | 112.6 | 112.6 |
| | | Acrylic resin (A1''') having secondary hydroxyl group and alkoxysilyl group | Hydroxyl group-containing acrylic resin (A1-2) solution | | | | | | |
| | | Acrylic resin (A1'') having primary hydroxyl group and alkoxysilyl group | Hydroxyl group-containing acrylic resin (A1-3) solution | | | | | | |

TABLE 8-continued

| | | | Examples | | | | | |
|---|---|---|---|---|---|---|---|---|
| | | | 7 | 8 | 9 | 10 | 11 | 12 |
| Hydroxyl group-containing resin (A) | Primary hydroxyl group-containing acrylic resin (A1) | Hydroxyl group-containing acrylic resin (A1-4) solution | | | | | | |
| Crosslinking agent (B) | Polyisocyanate compound | "Sumidur N3300" | 32.4 | 32.4 | 32.4 | 32.4 | 32.4 | 32.4 |
| | Melamine resin | "CYMEL 202" (Note 5) | | | | | | |
| Dispersion of silica particles (C) | | Product name | C-7 | C-8 | C-9 | C-10 | C-11 | C-12 |
| | | Compounding amount | 7.5 | 7.5 | 7.5 | 7.5 | 7.5 | 7.5 |
| Catalyst | | "Nacure 4167" | 1.0 | 1.0 | 1.0 | 1.0 | 1.0 | 1.0 |
| Ultraviolet absorber | Ultraviolet absorber having hydroxyl group | "Tinuvin 405" | | | | | | |
| Hindered amine-based light stabilizer | Hindered amine-based light stabilizer having hydroxyl group | "Tinuvin 152" | | | | | | |
| | Hindered amine-based light stabilizer having no hydroxyl group | "Tinuvin 123" (Note 6) | | | | | | |
| Surface conditioner | | "BYK-300" "BYK-333" (Note 7) | 0.38 | 0.38 | 0.38 | 0.38 | 0.38 | 0.38 |
| Evaluation | Scratch resistance in car wash after outdoor exposure | | A | A | A | A | A | B |

TABLE 9

| | | | | Examples | | | | | |
|---|---|---|---|---|---|---|---|---|---|
| | | | | 13 | 14 | 15 | 16 | 17 | 18 |
| | Name of coating composition | | | No. 13 | No. 14 | No. 15 | No. 16 | No. 17 | No. 18 |
| Hydroxyl group-containing resin (A) | Hydroxyl group-containing acrylic resin (A1) | Secondary hydroxyl group-containing acrylic resin (A1') | Hydroxyl group-containing acrylic resin (A1-1) solution | 50.8 | | | 56.3 | | 48.2 |
| | | Acrylic resin (A1''') having secondary hydroxyl group and alkoxysilyl group | Hydroxyl group-containing acrylic resin (A1-2) solution | 61.8 | 112.6 | | | | 58.7 |
| | | Acrylic resin (A1") having primary hydroxyl group and alkoxysilyl group | Hydroxyl group-containing acrylic resin (A1-3) solution | | | 112.6 | 56.3 | | |
| | | Primary hydroxyl group-containing acrylic resin (A1) | Hydroxyl group-containing acrylic resin (A1-4) solution | | | | | 112.6 | |
| Crosslinking agent (B) | Polyisocyanate compound | | "Sumidur N3300" | 32.4 | 32.4 | 32.4 | 32.4 | 32.4 | 30.8 |
| | Melamine resin | | "CYMEL 202" (Note 5) | | | | | | 6.25 |
| Dispersion of silica particles (C) | | | Product name | C-3 | C-3 | C-3 | C-3 | C-3 | C-3 |
| | | | Compounding amount | 7.5 | 7.5 | 7.5 | 7.5 | 7.5 | 7.5 |
| Catalyst | | | "Nacure 4167" | 1.0 | 1.0 | 1.0 | 1.0 | 1.0 | 1.0 |
| Ultraviolet absorber | Ultraviolet absorber having hydroxyl group | | "Tinuvin 405" | | | | | | |
| Hindered amine-based light stabilizer | Hindered amine-based light stabilizer having hydroxyl group | | "Tinuvin 152" | | | | | | |
| | Hindered amine-based light stabilizer having no hydroxyl group | | "Tinuvin 123" (Note 6) | | | | | | |
| Surface conditioner | | | "BYK-300" "BYK-333" (Note 7) | 0.38 | 0.38 | 0.38 | 0.38 | 0.38 | 0.38 |
| Evaluation | Scratch resistance in car wash after outdoor exposure | | | A | A | A | B | B | A |

TABLE 10

| | | | | Examples | | | | | | |
|---|---|---|---|---|---|---|---|---|---|---|
| | | | | 19 | 20 | 21 | 22 | 23 | 24 | 25 |
| | | Name of coating composition | | No. 19 | No. 20 | No. 21 | No. 22 | No. 23 | No. 24 | No. 25 |
| Hydroxyl group-containing resin (A) | Hydroxyl group-containing acrylic resin (A1) | Secondary hydroxyl group-containing acrylic resin (A1') | Hydroxyl group-containing acrylic resin (A1-1) solution | 112.6 | 112.6 | 112.6 | 112.6 | 112.6 | 112.6 | 112.6 |
| | | Acrylic resin (A1''') having secondary hydroxyl group and alkoxysilyl group | Hydroxyl group-containing acrylic resin (A1-2) solution | | | | | | | |
| | | Acrylic resin (A1'') having primary hydroxyl group and alkoxysilyl group | Hydroxyl group-containing acrylic resin (A1-3) solution | | | | | | | |
| | | Primary hydroxyl group-containing acrylic resin (A1) | Hydroxyl group-containing acrylic resin (A1-4) solution | | | | | | | |
| Crosslinking agent (B) | | Polyisocyanate compound | "Sumidur N3300" | 32.4 | 32.4 | 32.4 | 32.4 | 32.4 | 32.4 | 32.4 |
| | | Melamine resin | "CYMEL 202" (Note 5) | | | | | | | |
| Dispersion of silica particles (C) | | | Product name | C-3 | C-3 | C-3 | C-13 | C-14 | C-15 | C-16 |
| | | | Compounding amount | 3.8 | 12.5 | 7.5 | 7.5 | 7.5 | 7.5 | 7.5 |
| | | Catalyst | "Nacure 4167" | 1.0 | 1.0 | 1.0 | 1.0 | 1.0 | 1.0 | 1.0 |
| Ultraviolet absorber | Ultraviolet absorber having hydroxyl group | | "Tinuvin 405" | | | | | | | |
| Hindered amine-based light stabilizer | Hindered amine-based light stabilizer having hydroxyl group | | "Tinuvin 152" | | | | | | | |
| | Hindered amine-based light stabilizer having no hydroxyl group | | "Tinuvin 123" (Note 6) | | | | | | | |
| | Surface conditioner | | "BYK-300" | 0.38 | 0.38 | | 0.38 | 0.38 | 0.38 | 0.38 |
| | | | "BYK-333" (Note 7) | | | 0.10 | | | | |
| Evaluation | Scratch resistance in car wash after outdoor exposure | | | A | A | A | A | B | B | A |

TABLE 11

| | | | | Examples | | | | | | |
|---|---|---|---|---|---|---|---|---|---|---|
| | | | | 26 | 27 | 28 | 29 | 30 | 31 | 32 |
| | | Name of coating composition | | No. 26 | No. 27 | No. 28 | No. 29 | No. 30 | No. 31 | No. 32 |
| Hydroxyl group-containing resin (A) | Hydroxyl group-containing acrylic resin (A1) | Secondary hydroxyl group-containing acrylic resin (A1') | Hydroxyl group-containing acrylic resin (A1-1) solution | 112.6 | 112.6 | 112.6 | 112.6 | 112.6 | 112.6 | 112.6 |
| | | Acrylic resin (A1''') having secondary hydroxyl group and alkoxysilyl group | Hydroxyl group-containing acrylic resin (A1-2) solution | | | | | | | |
| | | Acrylic resin (A1'') having primary hydroxyl group and alkoxysilyl group | Hydroxyl group-containing acrylic resin (A1-3) solution | | | | | | | |
| | | Primary hydroxyl group-containing acrylic resin (A1) | Hydroxyl group-containing acrylic resin (A1-4) solution | | | | | | | |
| Crosslinking agent (B) | | Polyisocyanate compound | "Sumidur N3300" | 32.4 | 32.4 | 32.4 | 32.4 | 32.4 | 32.4 | 32.4 |
| | | Melamine resin | "CYMEL 202" (Note 5) | | | | | | | |
| Dispersion of silica particles (C) | | | Product name | C-17 | C-18 | C-19 | C-20 | C-21 | C-22 | C-23 |
| | | | Compounding amount | 7.5 | 7.5 | 7.5 | 7.5 | 7.5 | 7.5 | 7.5 |
| | | Catalyst | "Nacure 4167" | 1.0 | 1.0 | 1.0 | 1.0 | 1.0 | 1.0 | 1.0 |

TABLE 11-continued

|  |  |  | Examples | | | | | | |
|---|---|---|---|---|---|---|---|---|---|
|  |  |  | 26 | 27 | 28 | 29 | 30 | 31 | 32 |
| Ultraviolet absorber | Ultraviolet absorber having hydroxyl group | "Tinuvin 405" | | | | | | | |
| Hindered amine-based light stabilizer | Hindered amine-based light stabilizer having hydroxyl group | "Tinuvin 152" | | | | | | | |
|  | Hindered amine-based light stabilizer having no hydroxyl group | "Tinuvin 123" (Note 6) | | | | | | | |
|  | Surface conditioner | "BYK-300" "BYK-333" (Note 7) | 0.38 | 0.38 | 0.38 | 0.38 | 0.38 | 0.38 | 0.38 |
| Evaluation | Scratch resistance in car wash after outdoor exposure | | A | A | A | A | A | A | A |

TABLE 12

|  |  |  |  | Examples | | | | | |
|---|---|---|---|---|---|---|---|---|---|
|  |  |  |  | 33 | 34 | 35 | 36 | 37 | 38 |
|  | Name of coating composition | | | No. 33 | No. 34 | No. 35 | No. 36 | No. 37 | No. 38 |
| Hydroxyl group-containing resin (A) | Hydroxyl group-containing acrylic resin (A1) | Secondary hydroxyl group-containing acrylic resin (A1') | Hydroxyl group-containing acrylic resin (A1-1) solution | 112.6 | 112.6 | 112.6 | 112.6 | 112.6 | 112.6 |
|  |  | Acrylic resin having secondary hydroxyl group and alkoxysilyl group (A1''') | Hydroxyl group-containing acrylic resin (A1-2) solution | | | | | | |
|  |  | Acrylic resin having primary hydroxyl group and alkoxysilyl group (A1'') | Hydroxyl group-containing acrylic resin (A1-3) solution | | | | | | |
|  |  | Primary hydroxyl group-containing acrylic resin (A1) | Hydroxyl group-containing acrylic resin (A1-4) solution | | | | | | |
| Crosslinking agent (B) | | Polyisocyanate compound | "Sumidur N3300" | 32.4 | 32.4 | 32.4 | 32.4 | 32.4 | 32.4 |
|  |  | Melamine resin | "CYMEL 202" (Note 5) | | | | | | |
| Dispersion of silica particles (C) | | | Product name | C-24 | C-25 | C-26 | C-27 | C-28 | C-29 |
|  |  |  | Compounding amount | 7.5 | 7.5 | 7.5 | 7.5 | 7.5 | 7.5 |
|  | Catalyst | | "Nacure 4167" | 1.0 | 1.0 | 1.0 | 1.0 | 1.0 | 1.0 |
| Ultraviolet absorber | Ultraviolet absorber having hydroxyl group | | "Tinuvin 405" | | | | | | |
|  | Hindered amine-based light stabilizer having hydroxyl group | | "Tinuvin 152" | | | | | | |
| Hindered amine-based light stabilizer | Hindered amine-based light stabilizer having no hydroxyl group | | "Tinuvin 123" (Note 6) | | | | | | |
|  | Surface conditioner | | "BYK-300" "BYK-333" (Note 7) | 0.38 | 0.38 | 0.38 | 0.38 | 0.38 | 0.38 |
| Evaluation | Scratch resistance in car wash after outdoor exposure | | | A | A | A | A | A | A |

TABLE 13

|  |  |  |  | Comparative Example | | | | |
|---|---|---|---|---|---|---|---|---|
|  |  |  |  | 1 | 2 | 3 | 4 | 5 |
|  |  | Name of coating composition |  | No. 39 | No. 40 | No. 41 | No. 42 | No. 43 |
| Hydroxyl group-containing resin (A) | Hydroxyl group-containing acrylic resin (A1) | Secondary hydroxyl group-containing acrylic resin (A1') | Hydroxyl group-containing acrylic resin (A1-1) solution | 112.6 | 112.6 | 112.6 | 112.6 | 112.6 |
|  |  | Acrylic resin (A1''') having secondary hydroxyl group and alkoxysilyl group | Hydroxyl group-containing acrylic resin (A1-2) solution |  |  |  |  |  |
|  |  | Acrylic resin (A1'') having primary hydroxyl group and alkoxysilyl group | Hydroxyl group-containing acrylic resin (A1-3) solution |  |  |  |  |  |
|  |  | Primary hydroxyl group-containing acrylic resin (A1) | Hydroxyl group-containing acrylic resin (A1-4) solution |  |  |  |  |  |
| Crosslinking agent (B) |  | Polyisocyanate compound | "Sumidur N3300" | 32.4 | 32.4 | 32.4 | 32.4 | 32.4 |
|  |  | Melamine resin | "CYMEL 202" (Note 5) |  |  |  |  |  |
| Dispersion of silica particles (C) |  |  | Product name | C-30 | C-30 | C-30 | C-30 | C-31 |
|  |  |  | Compounding amount | 7.5 | 7.5 | 7.5 | 7.5 | 7.5 |
|  | Catalyst |  | "Nacure 4167" | 1.0 | 1.0 | 1.0 | 1.0 | 1.0 |
| Ultraviolet absorber | Ultraviolet absorber having hydroxyl group |  | "Tinuvin 405" |  | 3.0 |  |  |  |
| Hindered amine-based light stabilizer | Hindered amine-based light stabilizer having hydroxyl group |  | "Tinuvin 152" |  | 3.0 |  |  |  |
|  | Hindered amine-based light stabilizer having no hydroxyl group |  | "Tinuvin 123" (Note 6) |  |  |  | 3.0 |  |
|  | Surface conditioner |  | "BYK-300" "BYK-333" (Note 7) | 0.38 | 0.38 | 0.38 | 0.38 | 0.38 |
| Evaluation | Scratch resistance in car wash after outdoor exposure |  |  | D | C | C | D | C |

(Note 5)
"CYMEL 202": trade name, available from Allnex Japan Inc., melamine resin, solid content 80%.
(Note 6)
"Tinuvin 123": trade name, available from BASF, hindered amine-based light stabilizer having no hydroxyl group, solid content 100%.
(Note 7)
"BYK-333": trade name, available from BYK Chemie GMBH, surface conditioner, active ingredient 100%.

Although embodiments and examples of the present invention have been specifically described above, the present invention is not limited to the embodiments described above, and various modifications based on the technical idea of the present invention are possible.

The invention claimed is:

1. A coating composition comprising:
a hydroxyl group-containing resin (A);
a crosslinking agent (B); and
a dispersion of silica particles (C) to which a hydroxyl group-containing acrylic resin (c1) is bonded and to which an ultraviolet absorber (c21) and/or a hindered amine-based light stabilizer (c22) is bonded.

2. The coating composition according to claim 1, wherein the hydroxyl group-containing resin (A) includes a resin (A') having a hydroxyl group and an alkoxysilyl group.

3. The coating composition according to claim 1, wherein the hydroxyl group-containing resin (A) includes a hydroxyl group-containing acrylic resin (A1).

4. The coating composition according to claim 1, wherein the crosslinking agent (B) includes a polyisocyanate compound (B1).

5. The coating composition according to claim 1, wherein the ultraviolet absorber (c21) and/or the hindered amine-based light stabilizer (c22) is bonded to the hydroxyl group-containing acrylic resin (c1), and the hydroxyl group-containing acrylic resin (c1), to which the ultraviolet absorber (c21) and/or the hindered amine-based light stabilizer (c22) is bonded, is bonded to the silica particles (C).

6. The coating composition according to claim 5, wherein the dispersion of silica particles (C) includes a reaction product of silica particles (a) having a polymerizable unsaturated group and a polymerizable unsaturated monomer mixture (b), and the polymerizable unsaturated monomer mixture (b) contains, as at least a part of components thereof, a hydroxyl group-containing polymerizable unsaturated monomer and at least one type of polymerizable unsaturated monomer selected from a polymerizable unsaturated monomer to which the ultraviolet absorber (c21) is bonded and a polymerizable unsaturated monomer to which the hindered amine-based light stabilizer (c22) is bonded.

7. The coating composition according to claim 6, wherein a proportion of the hydroxyl group-containing polymerizable unsaturated monomer in the polymerizable unsaturated monomer mixture (b) is in a range of 4.5 to 37.5 mass % with respect to a total amount of the polymerizable unsaturated monomer mixture (b).

8. The coating composition according to claim 6, wherein the hydroxyl group-containing acrylic resin (c1) produced from the polymerizable unsaturated monomer mixture (b) has a hydroxyl value in a range of 20 to 215 mg KOH/g.

9. The coating composition according to claim 6, wherein a total proportion of the polymerizable unsaturated monomer to which the ultraviolet absorber (c21) is bonded and the polymerizable unsaturated monomer to which the hindered amine-based light stabilizer (c22) is bonded in the polymerizable unsaturated monomer mixture (b) is in a range of 0.5 to 40 mass % with respect to the total amount of the polymerizable unsaturated monomer mixture (b).

10. The coating composition according to claim 6, wherein a mass ratio of the silica particles (a) having a polymerizable unsaturated group to the polymerizable unsaturated monomer mixture (b) is in a range of 20/80 to 90/10 in terms of a ratio (a)/(b).

11. The coating composition according to claim 1, wherein each of the ultraviolet absorber (c21) and/or the hindered amine-based light stabilizer (c22), and the hydroxyl group-containing acrylic resin (c1) is independently bonded to the silica particles (C).

12. The coating composition according to claim 11,
wherein the dispersion of silica particles (C) includes a reaction product of silica particles (a') to which the ultraviolet absorber (c21) and/or the hindered amine-based light stabilizer (c22) is bonded and which have a polymerizable unsaturated group, and a polymerizable unsaturated monomer mixture (d), and
the polymerizable unsaturated monomer mixture (d) includes a hydroxyl group-containing polymerizable unsaturated monomer as at least a part of components thereof.

13. The coating composition according to claim 12, wherein a proportion of the hydroxyl group-containing polymerizable unsaturated monomer in the polymerizable unsaturated monomer mixture (d) is in a range of 4.5 to 50 mass % with respect to a total amount of the polymerizable unsaturated monomer mixture (d).

14. The coating composition according to claim 12, wherein the hydroxyl group-containing acrylic resin (c1) produced from the polymerizable unsaturated monomer mixture (d) has a hydroxyl value in a range of 20 to 215 mg KOH/g.

15. The coating composition according to claim 12, wherein a mass ratio of the silica particles (a') to which the ultraviolet absorber (c21) and/or the hindered amine-based light stabilizer (c22) is bonded and which have a polymerizable unsaturated group to the polymerizable unsaturated monomer mixture (d) is in a range of 20/80 to 90/10 in terms of a ratio (a')/(d).

16. A method of forming a multilayer coating film by sequentially applying at least one layer of a colored basecoat paint and at least one layer of a clearcoat paint to an object to be coated, the method comprising applying the coating composition according to claim 1 as the clearcoat paint for an uppermost layer.

\* \* \* \* \*